US012175952B2

(12) United States Patent
Ashkenazi

(10) Patent No.: US 12,175,952 B2
(45) Date of Patent: Dec. 24, 2024

(54) TOY GUITAR WITH EXPANDABLE NECK

(71) Applicant: KIDDESIGNS, INC., Rahway, NJ (US)

(72) Inventor: Isaac Ashkenazi, Rahway, NJ (US)

(73) Assignee: KIDDESIGNS, INC., Rahway, NJ (US)

( * ) Notice: Subject to any disclaimer, the term of this patent is extended or adjusted under 35 U.S.C. 154(b) by 256 days.

(21) Appl. No.: 17/818,615

(22) Filed: Aug. 9, 2022

(65) Prior Publication Data

US 2023/0050060 A1 Feb. 16, 2023

Related U.S. Application Data

(60) Provisional application No. 63/232,526, filed on Aug. 12, 2021.

(51) Int. Cl.
*G10D 3/095* (2020.01)
*A63H 5/00* (2006.01)
(Continued)

(52) U.S. Cl.
CPC ............... *G10D 3/095* (2020.02); *A63H 5/00* (2013.01); *G10D 1/08* (2013.01); *G10H 1/342* (2013.01)

(58) Field of Classification Search
CPC . G10D 3/095; G10D 1/08; A63H 5/00; A63H 33/22; A63H 33/30; G10H 1/342;
(Continued)

(56) References Cited

U.S. PATENT DOCUMENTS 4,191,085 A 3/1980 Litwin
D256,368 S 8/1980 Bolen
(Continued)

FOREIGN PATENT DOCUMENTS

| | | |
|---|---|---|
| CN | 304359600 | 11/2017 |
| CN | 306680845 | 7/2021 |
| WO | 2011006149 A1 | 1/2011 |

OTHER PUBLICATIONS

Ekids, Rainbow Toy Guitar, published [online]. Retrieved from internet, Dec. 7, 2022, https://amazon.com/ekids-rainbow-guitar-built-musical/d/p/BOBDGG1TTT (Year: 2022).
(Continued)

*Primary Examiner* — Kimberly R Lockett
(74) *Attorney, Agent, or Firm* — Dorsey & Whitney LLP

(57) ABSTRACT

A toy guitar includes a guitar body defining an interior space. The toy guitar may further include a track extending within the interior space from an opening of the guitar body. The toy guitar may further include a guitar neck arranged partially in the opening. The neck is manipulateable between an extended position in which the guitar neck extends from the guitar body and a retracted position in which the guitar neck is at least partially retracted into the interior space along the track. In some cases, the guitar neck may include a retention structure configured to retain the guitar neck in the extended position. The toy guitar may also include an input assembly integrated with the guitar neck configured to cause the toy guitar to emit a light or a sound upon receipt of an input when the guitar neck is in the extended position.

20 Claims, 20 Drawing Sheets

(51) Int. Cl.
*G10D 1/08* (2006.01)
*G10H 1/34* (2006.01)

(58) Field of Classification Search
CPC ............... G10H 1/32; G10H 2230/055; G10H 2230/135; G10H 2230/281
See application file for complete search history.

(56) References Cited

U.S. PATENT DOCUMENTS

| | | | | |
|---|---|---|---|---|
| D257,727 | S | 12/1980 | Kimble | |
| D259,199 | S | 5/1981 | Kimble et al. | |
| D300,154 | S | 3/1989 | Chen | |
| D315,744 | S | 3/1991 | Erch | |
| 5,058,479 | A | 10/1991 | Shaw | |
| D387,372 | S | 12/1997 | Lindert | |
| D405,459 | S | 2/1999 | Riboloff et al. | |
| D456,856 | S | 5/2002 | Kane et al. | |
| D516,114 | S | 2/2006 | Leach | |
| D516,607 | S | 3/2006 | Dawson et al. | |
| D524,788 | S | 7/2006 | Beard | |
| D526,305 | S | 8/2006 | Beard | |
| 7,326,838 | B1 | 2/2008 | Bunker | |
| D589,512 | S | 3/2009 | Gray | |
| D606,594 | S | 12/2009 | Guinchard et al. | |
| D626,962 | S | 11/2010 | Guinchard et al. | |
| D723,098 | S | 2/2015 | Roebke | |
| 8,993,862 | B2 | 3/2015 | Anderson | |
| D753,237 | S | 4/2016 | Jackson et al. | |
| D753,771 | S | 4/2016 | Jackson et al. | |
| D790,634 | S | 6/2017 | Fisch | |
| D927,587 | S | 8/2021 | Eubanks et al. | |
| 11,404,032 | B2 * | 8/2022 | Spangler | G10D 1/08 |
| 2019/0295514 | A1 | 9/2019 | Spangler | |

OTHER PUBLICATIONS

Gibson, SG Standard, published Feb. 6, 2020 [online]. Retrieved from internet, Dec. 7, 2022, https://www.amazon.com/gibson-sg-standard-heritage-cherry/dp/B07RGB4B2B/ref=sr_1_3?crid-1236NJ0QFHPB3&keywords=gibson+sg+guitar&qid=1670425617&sprefix.

Pimpmyconsole, NEXiLUX Mini Guitar, published Aug. 29, 2009 [online]. Retrieved from internet, Dec. 5, 2022, https://www.youtube.com/watch?v=ehepvCBccHk (Year: 2009).

"Pocketstrings Pocketstrings 6 Fret Black", https://www.guitarcenter.com/PocketStrings/PocketStrings-6-Fret-Black-1372692949687.gc?cntry=US&source=4WWRWXGP&gclid=Cj0KCQjw-LOEBhDCARIsABrC0TmNBWExQLiOL2XwEmdc0pw7bROiYdEWDEL7ZsBh2A7w2Td7Ozmsp5MaAgzWEALw_wcB.

"Jamstick Guitar Trainer", https://www.amazon.com/dp/B002NBSA0G/ref=cm_sw_r_cp_api_glt_fabc_1MNYFDVMY1YGEDAJN6AE.

"Ministar Portable Travel Mini Pocket Silent Electric Guitar with 1 Pickup, Rosewood Fretboard, Adult/ Children Can Play", https://jamstik.com/products/jamstik-guitar-trainer?variant=34126917599365.

"OB660—The Ultimate Acoustic Travel Bass", https://voyageairguitar.com/.

Astley-Brown, Michael , "Meet Jammy, the digital guitar with a telescopic neck that fits in a backpack", https://www.musicradar.com/news/meet-jammy-the-digital-guitar-with-a-telescopic-neck-that-fits-in-a-backpack, May 16, 2017.

Jovanovic, Marki , "The 10 Best Pocket Guitars", https://www.guitarchords247.com/best-pocket-guitars/, 2018.

"Solid Sitka / Mahogany Travel Guitar—OF410", 2017, Journey Instruments, https://journeyinstruments.com/product/solid-sitkamahogany-travel-guitar-of410/, accessed Aug. 12, 2021.

"Wireless Mini Guitar Retractable for PS2, PS3 & Wii Guitar Hero and Rock Band by NEXiLUX—WHITE", 2021, NEXiLUX, https://www.amazon.com/dp/B002NBSA0G/ref=cm_sw_r_cp_api_glt_fabc_1MNYFDVMY1YGEDAJN6AE, accessed Aug. 12, 2021.

* cited by examiner

TOY GUITAR WITH EXPANDABLE NECK

CROSS-REFERENCE TO RELATED APPLICATIONS

The present application claims priority to U.S. Provisional Patent Application No. 63/232,526, filed on Aug. 12, 2021, titled "Toy Guitar With Expandable Neck," which is incorporated herein by reference in its entirety.

FIELD

The described examples relate generally to toys and packaging configurations for the same.

BACKGROUND

Products for sale, such as toys, take up shelf space in a retail or other environment. In some cases, the amount of shelf space occupied by a product may be disproportionately large relative to a value of the product. A toy guitar, for example, may have an elongated neck that takes up disproportionately large amount of shelf space relative to the retail value of the product. Retailers may therefore be disinclined to stock the toy guitar to the extent that other products may be stocked that take up less shelf space relative to a value of the product. As such, there is a need for systems and techniques that reduce the amount of shelf space of a product, such as a toy guitar.

SUMMARY

Embodiments of the present invention are directed to a toy guitar and associated packaging systems, assemblies for retail presentation, and methods of operating the toy guitar.

In a first example, a toy guitar is disclosed. The toy guitar includes a guitar body defining an interior space. The toy guitar further includes a track extending within the interior space from an opening of the guitar body. The toy guitar further includes a guitar neck arranged partially in the opening. The guitar neck is manipulateable between an extended position in which the guitar neck extends from the guitar body and a retracted position in which the guitar neck is at least partially retracted into the interior space along the track. Further, the guitar neck includes a retention structure configured to retain the guitar neck in the extended position. The retention structure is further configured, upon receipt of a force input, to permit a transition of the toy guitar from the extended position to the retracted position.

In various implementations, the toy guitar may be operable in both the extended position and the retracted position. The toy guitar does not need to be assembled by a consumer or user to be operable. For example, the toy guitar does not require additional fasteners or couplings to operate after it is packaged.

In another example, the guitar body may define an outer contour configured to resemble an acoustic or electric guitar body. Further, the retention structure may include a detent configured to engage a holding feature of the guitar body. The holding feature may further include a through portion defined by the guitar body and extending into the interior space. The detent may be configured to be received by the through portion from the interior space when the guitar neck is in the extended position. In some cases, the detent may include an input surface exposed along the exterior of the guitar body when the detent is received by the through portion. The detent may be flexibly coupled with a main portion of the guitar neck such that in response to the force input on the input surface, the detent is releasable from the holding feature to permit the transition of the guitar from the extended position to the retracted position.

In another example, the track may extend generally linearly from the opening to a base portion of the guitar body. The guitar body may further include side contours that run a length of the track on opposing sides of the track. The track may be inset from the side contours within the interior space. A width of the guitar body spanning the side contours is at least twice a width of the track. In some cases, the track may include at least one guide component extending the length of the track. The guitar neck may be configured to be guided along the track by the at least one guide component. Correspondingly, the guitar neck may define a follower component configured for complimentary engagement with the guide component along the track.

In another example, the toy guitar may be configured to emit a light or a sound when the guitar neck is in the extended position. The transition of the toy guitar from the extended position to the retracted position may inhibit emission of the light or the sound.

In another example, an assembly for retail presentation is disclosed. The assembly may include a product packaging. The assembly may further include any of the toy guitars described herein. The toy guitar of the assembly may be held by the packaging and contained within a three-dimensional footprint of the packaging when the guitar neck is in the retracted position. In some instances, the packaging may include restraints, such as a zip tie or wire, that helps to hold the guitar in place within the packaging, however, the restraints do not impact the performance or operation of the guitar and may be omitted.

In another example, a toy guitar is disclosed. The toy guitar includes a guitar body defining an interior space and an opening extending into the interior space. The toy guitar further includes a guitar neck arranged partially in the opening. The guitar neck is manipulateable between an extended position in which the guitar neck extends from the guitar body and a retracted position in which the guitar neck is at least partially retracted into the interior space. The toy guitar further includes an input assembly integrated with the guitar neck. The input assembly is configured to cause the toy guitar to emit a light or a sound upon receipt of an input when the guitar neck is in the extended position. The input assembly may be electrically uncoupled with a power source of the toy guitar when the guitar neck is manipulated from the extended position.

In another example, the power source is arranged within the interior space. The guitar neck may include a neck electrical coupling component arranged in the interior space and electrically coupled with the power source when the toy guitar is in the extended position. In this regard, a transition of the toy guitar from the extended position to the retracted position may physically displace the neck electrical coupling component within the interior space to electrically uncouple the input assembly and the power source.

In another example, the toy guitar may further include a body electrical coupling component within the interior space. Accordingly, in the extended position, the body electrical coupling component and the neck electrical coupling component may form an electrical coupling between the power source and the input assembly. Further, in the retracted position, the physical displacement of the neck electrical coupling component may separate the neck electrical coupling component and the body electrical coupling component to electrically uncouple the input assembly and the power source. In some cases, the body electrical coupling component and the neck electrical coupling component may each define contact plates that are configured to form the electrical coupling through physical contact.

In another example, the guitar neck may include a fretboard. The input assembly may further include a button assembly arranged on the fretboard and configured to receive the input. The fretboard may include a button slot. The button assembly may include a button piece arranged in and protruding from the button slot. The button assembly may further include a switch arranged with the button piece such that a depression of the button piece causes an actuation of the switch. The actuation of the switch may be configured to cause the emission of the light or the sound. In some cases, the light or the sound comprises a first light or a first sound. As such, the button assembly may include a first button assembly configured to cause the emission of the first light or the first sound. Further, the input assembly may include a second button assembly configured to cause an emission of a second light or a second sound different from the first light or the first sound.

In another example, the toy guitar may further includes a track extending with the interior space from the opening and configured to guide movement of the guitar neck between the extended and retracted positions.

In another example, a method of expanding a toy guitar is disclosed. The method includes extending a guitar neck from a guitar body into an extended position. The method further includes retaining the guitar neck in the extended position by engaging a retention structure of the guitar neck with the guitar body. The method further includes manipulating the retention structure to release the guitar neck from the extended position. The method further includes causing the guitar neck to move from the extended position to a retracted position in which the guitar neck is at least partially received within an interior space of the guitar body.

In another example, the toy guitar further includes an input assembly integrated with the guitar neck configured to cause the toy guitar to emit a light or a sound upon receipt of an input. In this regard, the method may further include electrically coupling the input assembly to a power source of the guitar body when the toy guitar is in the extended position. The method may further include electrically uncoupling the input assembly from the power source when the guitar neck is manipulated from the extended position.

In another example, a toy is disclosed. The toy includes a body portion defining an interior space. The toy includes a first track extending within the interior space from a first opening of the body portion. The toy includes a second track extending within the interior space from a second opening of the body portion. The toy further includes a first peripheral component arranged partially in the first opening and engaged with the first track for movement between a first extended position and a first retracted position along a first direction relative to the body portion. The toy further includes a second peripheral component arranged partially in the second opening and engaged with the second track for movement between a second extended position and a second retracted position along a second direction relative to the body portion.

In another example, the first direction may be different from the second direction. In some cases, the first direction may extend opposite the second direction.

In another example, the first peripheral component may include a first retention structure configured to retain the first peripheral component in the first extended position. The first retention structure may be further configured to, upon receipt of a force input, permit a transition of the first peripheral component from the first extended position to the first retracted position. Further, the second peripheral component may include a second retention structure configured to retain the second peripheral component in the second extended position. The second retention structure may be further configured to, upon receipt of a force input, permit a transition of the second peripheral component from the second extended position to the second retracted position.

In another example, the toy may include a toy drum set. Accordingly, the first peripheral component may include a first moveable drum pad, and the second peripheral component may include a second moveable drum pad.

In another example, the toy includes a DJ mixer. Accordingly, the first peripheral component may include a first side mixer, and the second peripheral component may include a second side mixer.

In another example, the toy may include an early learning toy. Accordingly, the first peripheral component may include a first peripheral panel, and the second peripheral component comprises a second peripheral panel.

In another example, the toy may include a driving toy. Accordingly, the first peripheral component may include a first handle portion, and the second peripheral component comprises a second handle portion. In some cases, the first and second directions are opposing rotational directions.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
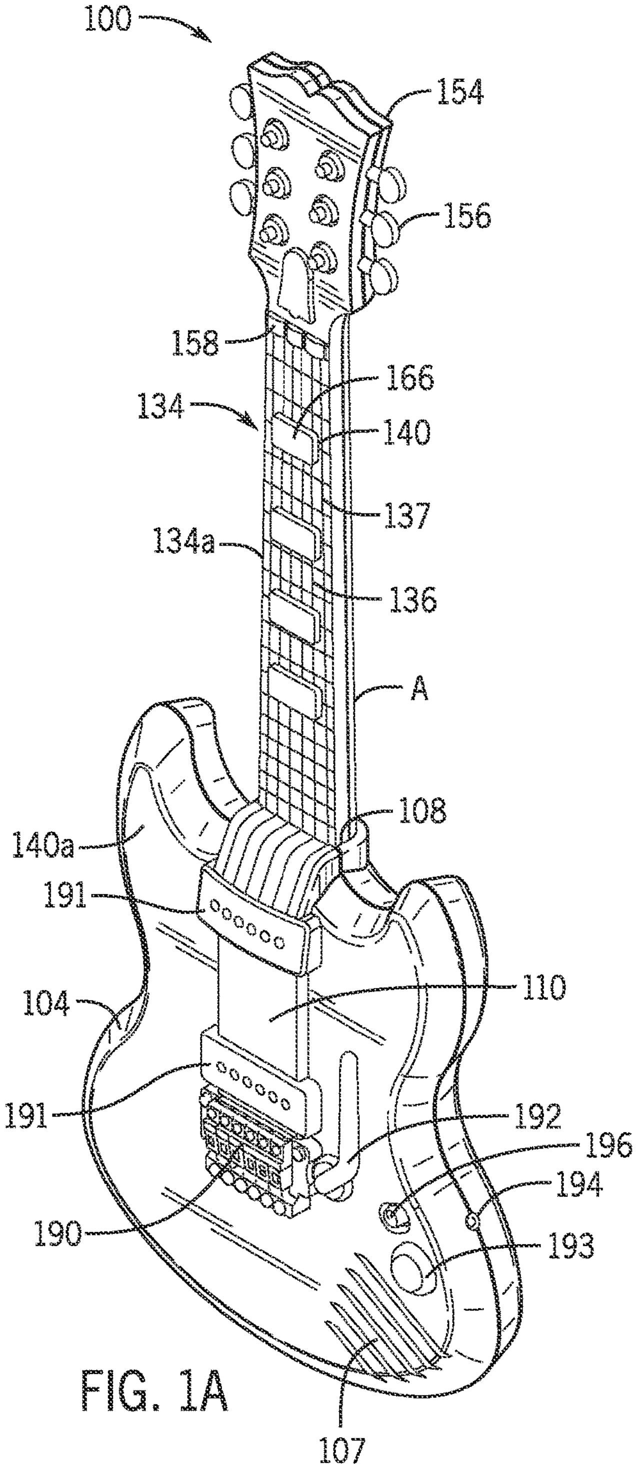
FIG. 1A depicts a top isometric view of a toy guitar in a first configuration.

The description that follows includes sample systems, methods, and apparatuses that embody various elements of the present disclosure. However, it should be understood that the described disclosure may be practiced in a variety of forms in addition to those described herein.

The following disclosure relates generally to a toy guitar and associated packaging systems, assemblies for shipping and retail presentation, and methods of operating the toy guitar. A toy guitar may occupy an amount of shelf space disproportionately large relative to the retail value of the toy guitar. For example, certain toys may be less expensive than other, more complex toys. However, conventional toy guitars typically occupied a relatively large amount of shelf space due to the characteristics of the guitar, including an elongated guitar neck that extends from a guitar body. The elongated guitar neck of conventional systems may extend the footprint of the toy on the retail shelf and potentially interfere or prevent the stocking of additional retail items adjacent the guitar. The extended footprint of the guitar on the retail shelf may reduce the willingness of retailers to stock the conventional guitar, particularly where the retail value of the guitar is less than the retail value of other retail products which could otherwise be stocked in the same space. In other instances, some toys may be packaged and displayed in retail in a dissembled or decoupled state, where the consumer is required to assemble the toy after purchase. Such configurations, while they may reduce shelf space, are inconvenient for the consumer, may dissuade a consumer from purchasing, especially if the consumer does not have appropriate equipment or ability to assemble the toy, and prevents the user from "testing" or experimenting with the toy before purchase.

The systems and techniques of the present disclosure may mitigate such hindrances, in part, by providing a toy guitar with one or more collapsible and extendedable components. In this manner, the toy guitar may have a first or extended configuration with a first footprint or size and a second or retracted configuration with a second foot print or size less than the second footprint. In extended configuration the toy guitar is arranged for use as a toy, whereas the retracted configuration the toy guitar is arranged for display and storage in a retail or other setting. In both configurations, however, the toy may remain coupled together, not requiring assembly or connection by the consumer of different pieces to one another. For example, the toy guitar may be operable in both the extended configuration and the retracted configuration and may not require external fasteners to be coupled thereto. In the retracted configuration, the toy guitar may have a reduced footprint for display in the retail setting and/or shipping, which may increase the desirability of the toy by retailers, while still maintaining a larger overall "use" configuration that may be more desirable to the end consumer (e.g., children).

In some instances, the toy guitar may include a collapsible neck that slides into or otherwise fits fully or partially into a guitar body to define the retracted configuration. The guitar neck may be subsequently manipulated and extended from the guitar body to define the extended configuration. The guitar neck may be repeatedly transitioned between the retracted and extended configuration. In some cases, the guitar neck is extendable while the toy guitar is held in a product packaging, allowing a consumer to test the functionality of the toy guitar. The guitar neck may returned to the retracted position for restocking on the retail shelf.

In one example, the guitar body may define an interior space and a track extending with the interior space from an opening at a top portion of the guitar body. The guitar neck may be arranged partially in the opening. The guitar neck is manipulated by a user or consumer between the extended and retracted position by moving the guitar neck into and out from the interior space of the guitar body, as guided by the track. It may be desirable to secure the guitar neck in the extended position, such as for maintaining the guitar neck in an elongated position during use of the guitar as an accessory. The guitar neck may therefore include a retention structure that operates to temporarily retain the guitar neck in the extended configuration relative to the guitar body. As described herein, the retention structure may include a flexible detent that physically engages a complimentary feature on the guitar body, such as an opening, lip, raised edge, and so on. In the extended configuration, the retention structure may generally resist movement of the guitar neck away from the extended position. The retention structure may also permit a transition of the guitar neck from the extended position to the retracted position, such as upon receipt of a force input. For example, a force input received at the detent may disengage the detent from the guitar body such that the guitar neck is slidable from the extended position to the retracted position.

It may be desirable to secure the guitar neck in the retracted configuration, such as for maintaining the guitar neck in the retracted position while the guitar is packaged for retail presentation. The guitar neck may therefore include a second retention structure that operates to temporarily retain the guitar neck in the retracted configuration relative to the guitar body. As described herein, the second retention structure may include a tang that physically engages a complimentary feature on the guitar body, such as a ridge, opening, lip, raised edge, and so on. In the retracted configuration, the second retention structure may generally resist movement of the guitar neck away from the retracted position. The second retention structure may also permit a transition of the guitar neck from the retracted position to the extended position, such as upon receipt of at least one force input. For example, a force input received at an input surface of the second retention structure may disengage the tang from the ridge of the guitar body such that the guitar neck is slidable from the retracted position to the extended position.

In some cases, the toy guitar may be configured to emit light and sound. For example, the toy guitar may include an input assembly integrated with the guitar neck. The input assembly may be configured to receive a user input, such as via one or buttons, and cause the guitar to emit a light or a sound upon the receipt of such input. The input assembly may be configured to cause the light or the sound to be emitted when the guitar neck is in the extended configuration. When the guitar neck is manipulated from the extended configuration, the input assembly may be configured to disable the functionality of the toy guitar to emit the light or the sound. For example, and as described herein, the input assembly may be electrically decoupled with a power source of the toy guitar wen the guitar neck is manipulated from the extended position. The electrical decoupling may prevent the input assembly from causing the toy guitar to emit the light or the sound notwithstanding user inputs received at the input assembly. In other instances, the electrical features may be coupled in both configurations, allowing the toy to be usable at full functionality in other configuration.

Further disclosed herein is an assembly for retail presentation. The assembly includes a product packaging. The assembly further includes any of the toy guitars described herein held in the packaging. In one example, the packaging may include a variety of packaging walls that form a backing, base, and/or other structures for holding the toy guitar. The structures of the packaging may allow the toy guitar to be placed on a retail shelf with the toy guitar contacting the shelf or adjacently stocked products. The structures of the packaging may define a three-dimensional footprint within which the guitar is held. The assembly for retail presentation may be configured such that the toy guitar is fully contained within the three-dimensional footprint of the packaging when the guitar neck is in the retracted position. As described above, the input assembly may be electrically disconnected in the retracted position, and thus the toy guitar may be unable to emit lights and sounds when fully contained within the product packaging.

The toy guitar may be held by the packaging and exposed to external environment (e.g., the packaging does not necessarily fully enclose the toy guitar). In some cases, while still held and/or connected to the packaging, the toy guitar may be manipulated into the extended configuration. In the extended configuration, at least the guitar neck may extend partially outside of the three-dimensional footprint of the packaging. The toy guitar may be configured to emit lights and sounds when held by the packaging and in a configuration in which the guitar neck extends partially outside the three-dimensional footprint of the packaging. This may be beneficial for purposes of allowing a consumer to sample the functionality of the toy guitar without removing the toy guitar from the packaging. The toy guitar may be subsequently returned to the retracted configuration as returned to the shelf as needed.

It will be appreciated that the toy guitar is one example toy that may be extendable and retractable according to the systems and techniques described herein. Contemplated and described herein is a variety of toys that include a main body portion and one or more peripheral or wing components that are expandable and retractable relative to the main body portion. Sample toys include, without limitation, a drum set, an early learning toy, a DJ mixer, a driving toy, and so on. In some cases, the toy may include a body portion and a first peripheral component and a second peripheral components that are expandable and retractable therefrom. The first and second peripheral portions may be side drum pads, side mixers, toy panels, driving handles, and so on as appropriate for a given toy. The first and second peripheral components may be moveable (expandable and retractable) along first and second directions, respectively. The first and second directions may be different or opposing directions, including linear and rotational directions. The toy may include one or more or all of the mechanisms described below with reference to the example toy guitar, including one or more tracks, retention structures, and/or electrical components or assemblies.

Figure 1B:
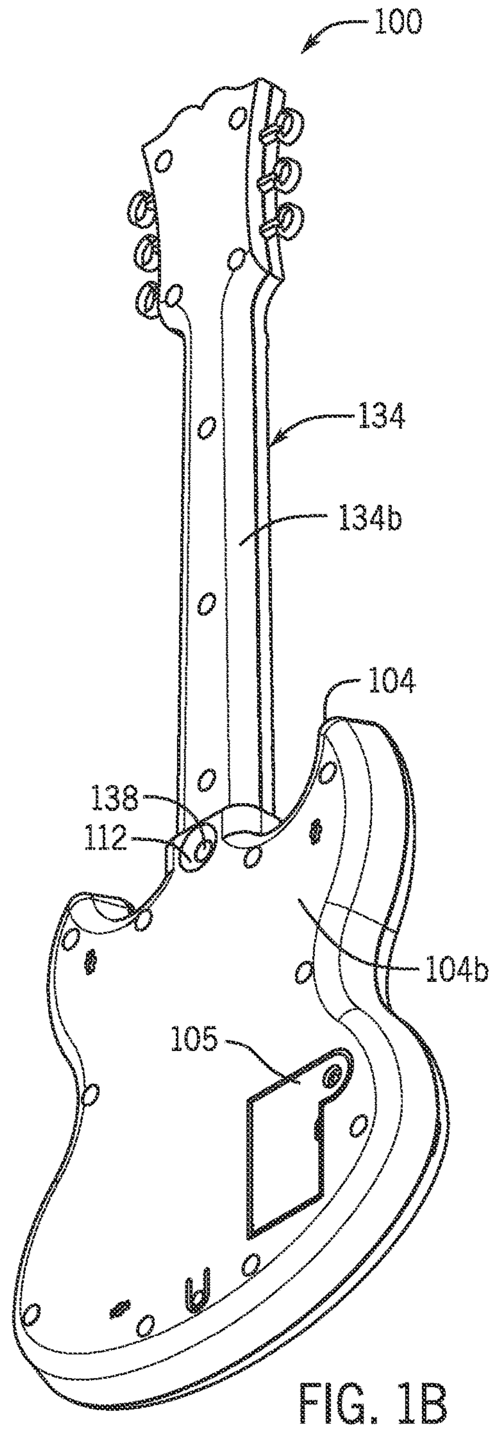
FIG. 1B depicts a bottom isometric view of the toy guitar of FIG. 1A.
Figure 2:
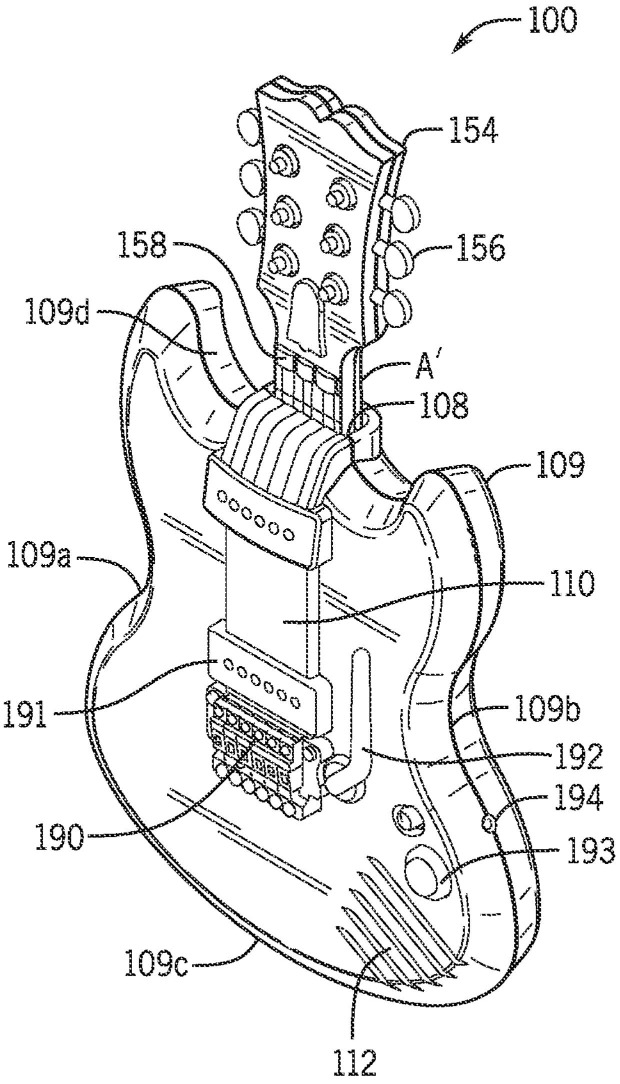
FIG. 2 depicts a top isometric view of the toy guitar of FIG. 1A in a second configuration.

Turning to the drawings, FIGS. 1A and 1B depict a toy guitar 100 in an extended configuration A. The toy guitar 100 may include a guitar body 104 and a guitar neck 134. The extended configuration A may be a first position of the guitar neck 134 relative to the guitar body 104. The guitar body 104 and guitar neck 134 may cooperate to define a shape or an electric or acoustic guitar such that the toy guitar 100 resembles a genuine musical instrument. The guitar neck 134 is broadly manipulateable, e.g., movable or slidable, relative to the guitar body 104 to reduce an overall size of the toy guitar 100. For example, and as shown in FIG. 2, the guitar neck 134 may be manipulated and received at least partially within the guitar body 104 to define a retracted configuration A'. The retracted configuration A' may reduce the overall size of the toy guitar, in one example, to minimize the amount of shelf space occupied by the toy guitar 100. The retracted configuration A' may be a second position of the guitar neck 134 relative to the guitar body 104. The various components of the toy guitar 100 may remain coupled in the retracted configuration A'. As such, the toy guitar 100 may be operable in the retracted configuration A'. In this manner, these components of the toy guitar 100 need not separate from one another in order to reduce a three-dimensional footprint of the toy guitar 100. The toy guitar 100 does not need to be assembled by a consumer or user to be operable. For example, the toy guitar 100 does not require additional external fasteners or couplings, such as screws, to be operable and have full or substantially fully functionality.

Figure 3A:
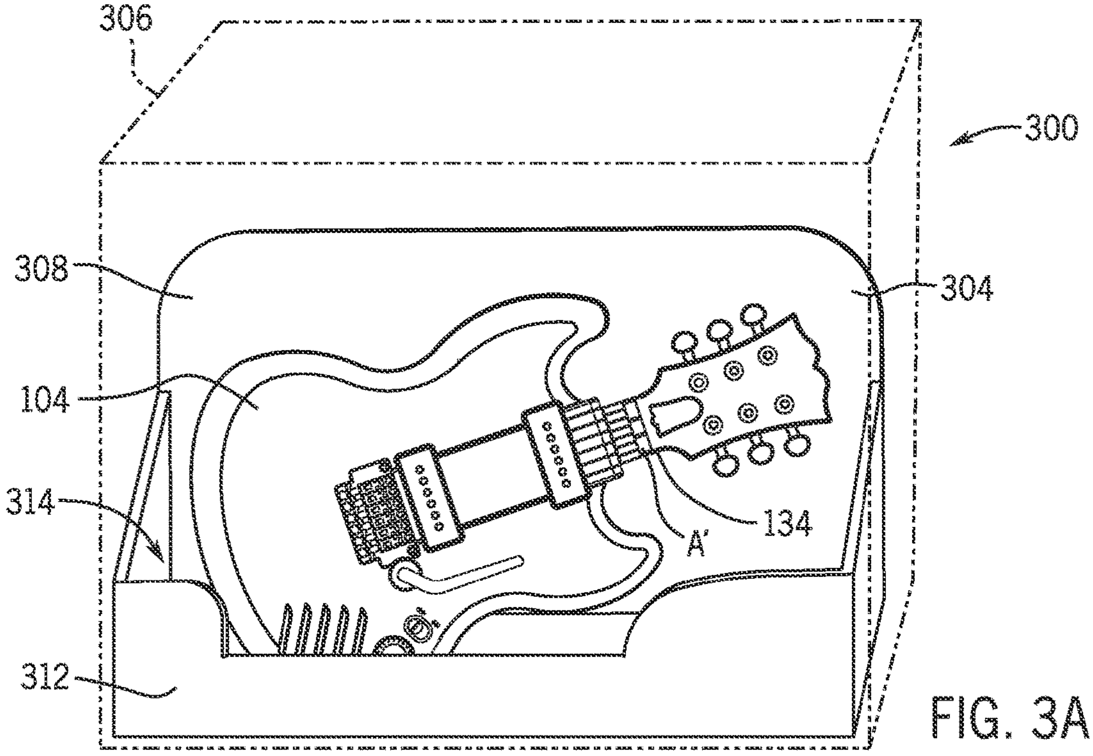
FIG. 3A depicts a packaging assembly including a packaging and the toy guitar of FIG. 2.
Figure 3B:
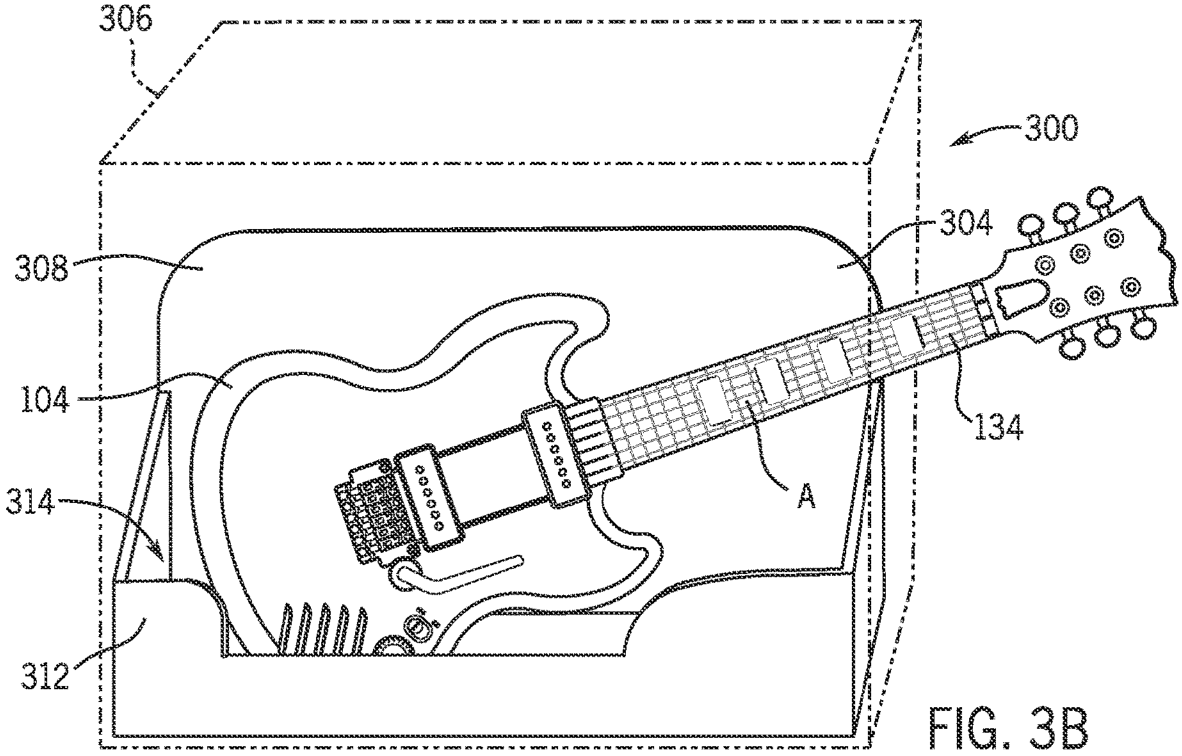
FIG. 3B depicts the packaging assembly of FIG. 3A with the toy guitar in the first configuration of FIG. 1A.

To illustrate, and with reference to FIGS. 3A and 3B, an assembly 300 is depicted including the toy guitar 100 held in a sample product packaging 304. The product packaging 304 is shown as including a backing 308 and side walls 312 that define a zone 314 within which the toy guitar 100 may be held. The backing 308, side walls 312, and/or other features of the product packaging may be constructed from a cardboard material and associated with various branding and product information. Many constructions of the product packaging are possible and contemplated herein. The backing 308, side walls 312 may define a three-dimensional footprint 306 (shown in dashed line) of the product packaging 304. The three-dimensional footprint 306 may correspond to a three-dimensional volume that the assembly 300 would occupy on a shelf or display of a retail or other setting.

In FIG. 3A, the toy guitar 100 is shown in the retracted configuration A'. In the retracted configuration A', the toy guitar 100 is fully contained within the three-dimensional volume 306. For example, the guitar neck 134 is retracted at least partially into the guitar body 104 and thus the guitar neck 134 does not traverse a boundary of the three-dimensional footprint 306. The arrangement shown in FIG. 3A may be suited for display of the toy guitar 100 in a retail or other setting because the size of the toy guitar 100 is less than the size of the guitar in the extended configuration A (e.g., a size of the toy guitar 100 in which the toy guitar resembles the shape of an electric or acoustic guitar). The arrangement shown in FIG. 3A may also be suited for shipping or mailing the assembly 300. For example, the cost to ship or mail the assembly 300 may be reduced with guitar neck 134 in the retracted configuration A' as the overall footprint or size of the toy guitar 100 is reduced.

With reference to FIG. 3B, the assembly 300 is shown in an arrangement in which the toy guitar 100 is held by the product packaging 304 and is manipulated into the extended configuration A. In the extended configuration A, the toy guitar 100 is positioned at least partially outside of the three-dimensional footprint 306. For example, in the extended configuration A, the guitar neck 134 is extended from the guitar body 104 and traverses a boundary of the three-dimensional footprint 306. The arrangement of FIG. 3B may be suited for demonstration of the toy guitar 100 to a consumer. For example, a consumer may view the toy guitar 100 in the extend configuration A without removing the toy guitar from the product packaging 300 in order to test the toy guitar 100, including testing the function of the toy guitar to emit lights and sounds in the extended configuration A, as described herein. The guitar neck 134 may be subsequently returned to the retracted configuration A' shown in FIG. 3A, for example, in order to return the assembly 300 to a shelf, display, and so on. In some cases, the guitar neck 134 may be retrained or limited to the retracted configuration A' by the packaging 304.

The guitar body 104 and the guitar neck 134 may include an assembly of components that cooperate to configured the toy guitar 100 as resembling an acoustic or electric guitar. The guitar body 104, the guitar neck 134, and/or any other components of the toy guitar 100 may be formed from a plastic material, such as an injection molded material that is molded to form the respective components. Three-dimensional printing and other techniques may be used, without limitation, to form the components of the toy guitar 100.

Figure 5:
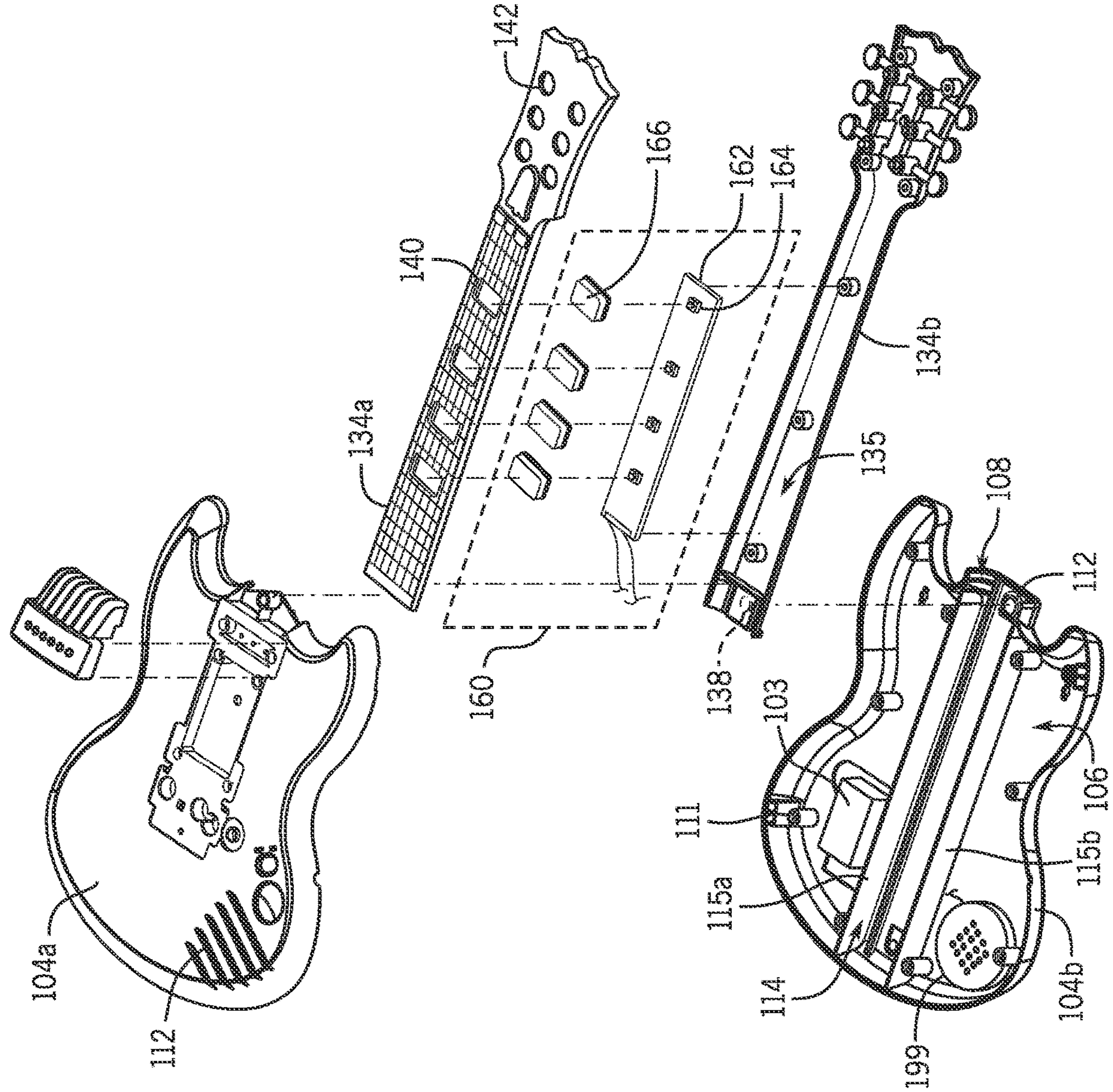
FIG. 5 depicts another exploded view of the toy guitar of FIG. 1A.

With reference to the guitar body 104, as shown in FIGS. 1A, 1B and 5, the guitar body 104 may include a first body portion 104*a* and the second body portion 104*b*. The first and second body portions 104*a*, 104*b* may be body halves or shells that cooperate to form the guitar body 104. For example, the first body portion 104*a* may define a front portion of the guitar body 104 and the second body portion 104*b* may define a back portion of the guitar body 104. The first and second body portions 104*a*, 104*b* may cooperate to define an interior space 106. The interior space 106 may be a cavity within the guitar body 104 configured to house one or more components of the toy guitar 100, including electrical components, and guitar neck 134, as described herein. The first and second body portions 104*a*, 104*b* may further cooperate to define an opening 108. The opening 108 may be an opening on an exterior of the guitar body 104 that extends into the interior space 106. The opening 108 may have a size, e.g., a width and a height, that is sufficient to accommodate the guitar neck 134. For example, the opening 108 may have a width and a height that is larger than a corresponding width and a corresponding height of the guitar neck such that the guitar neck 134 may be received at least partially within the opening 108. Further, the opening 108 may have a width and a height that is larger than a corresponding width and a corresponding height of the guitar neck such that the guitar neck 134 may slide relatively unobstructed into the guitar body 104 via the opening 108.

The guitar body 104, including the first body portion 104*a* and the second body portion 104*b*, may cooperate to define a shape of the guitar body 104 as resembling an acoustic or electric guitar, where the shape may be aesthetically pleasing. For example, the guitar body 104 may define an outer contour 109, as shown in FIG. 1A. that resembles a shape of an acoustic or electric guitar. The outer contour 109 may include side contours 109*a*, 109*b* that run in a direction that is generally aligned with or parallel to the guitar neck 134. The side contours 109*a*, 109*b* may define rib shapes or guitar body sides, such as those having a wave-like pattern with a central dip that defines a portion of the side contours 109*a*, 109*b* that is closer to a center of the guitar body 104, with the side contours 109*a*, 109*b* flaring out from the central dip on either side. The outer contour 109 may further include a bottom contour 109*c*. The bottom contour 109*c* may define a bottommost edge of the guitar body extending between the side contours 109*a*, 109*b*. The bottom contour 109*c* may generally define a convex, bottommost edge of the toy guitar 104 that forms a smooth, continuous edge extend from the side contour 109*a* to the side contour 109*b*. The outer contour 109 may further include a top contour 109*d*. The top contour 109*d* may define a topmost edge of the guitar body extending between the side contours 109*a*, 109*b* opposite the bottom contour 109*c*. In some cases the top contour 109*d* may define a cutaway or other feature indicative of guitar body of a genuine musical instrument. The opening 108 may be arranged along the top contour 109*d* and extend into the interior space 106. The outer contour 109 may be defined by both the first body portion 104*a* and the second body portion 104*b*.

Figure 4:
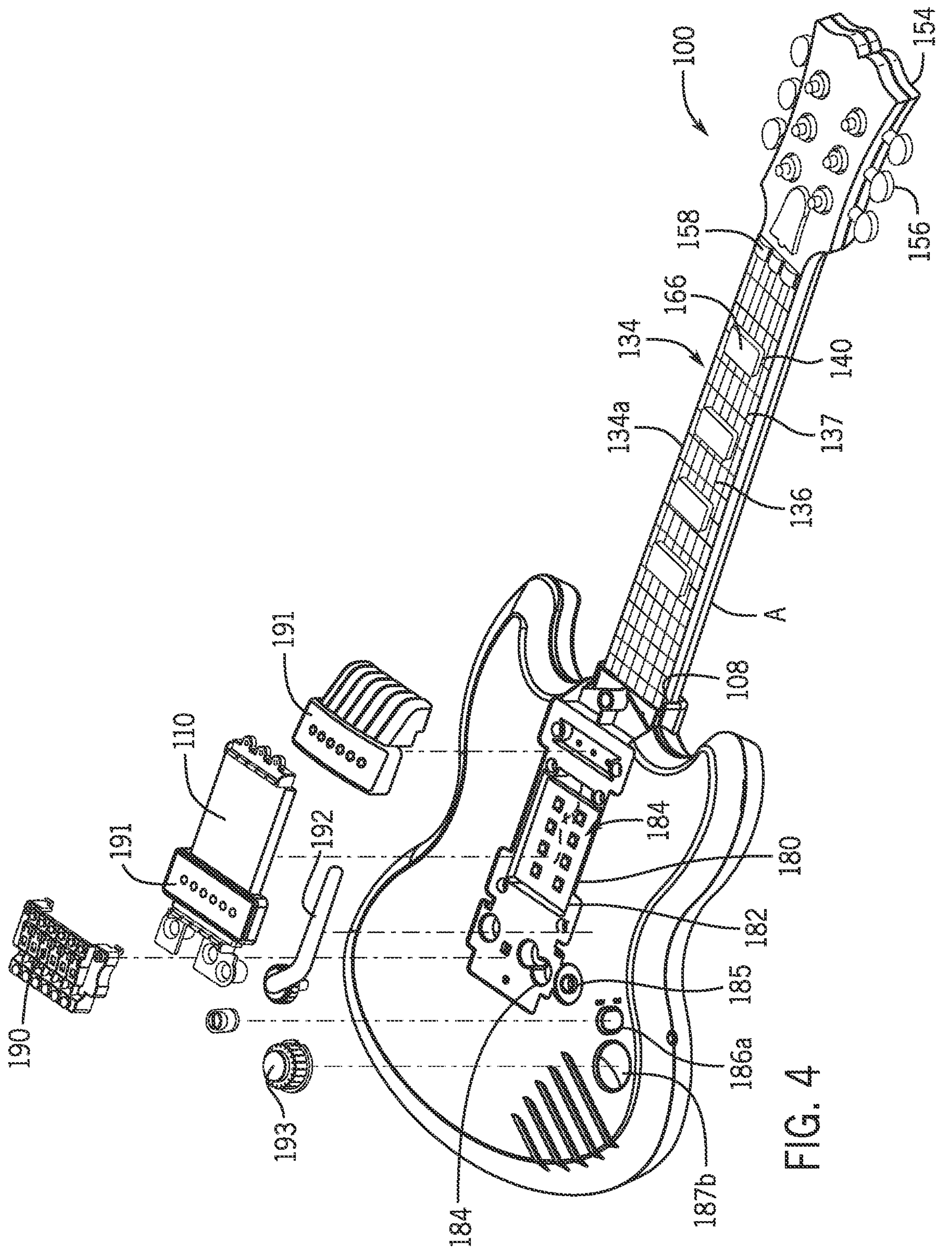
FIG. 4 depicts an exploded view of the toy guitar of FIG. 1A.

With continued reference to the first body portion 104*a*, a variety of features may be defined to accommodate components of the toy guitar 100, including electrical components, as described herein. For example, and as shown in FIG. 4, the first body portion 104*a* may define a mounting region 180 on an exterior face of the toy guitar 104. The mounting region 180 may be recessed relative to a surrounding portion of the exterior face. The mounting region 180 may generally define a region for mounting additional components to the guitar body, such as components that contribute to the resemblance of the toy guitar as an electric or acoustic guitar, including a bridge, pickups, selectors, controls, and so on. The mounting region 180 may also define one or more feature configured to receive electrical components of the toy guitar 104, such as lights, speakers, circuit board, wires, and so on.

For example, FIG. 4 shows the first body portion 104*a* as including an electronics tray 182. The electronics tray 182 may be a recessed portion of the first guitar body 104*a* may is configured to receive a circuit board, light elements (e.g., LEDs), wires, and so on. The electronics tray 182 may be sufficiently recessed such that the electronics tray 182 may receive these electrical components without the component protruding from the surround exterior surface defined by the first body portion 104*a*. Additionally features may be defined by the mounting region 180, including a bridge mounting hole 184 and a pickup selector mounting hole 185. The bridge mounting hole 184 and the pickup selector mounting hole may be features configured to receive one or more external features of the toy guitar 104, such as a bridge feature or pickup selector that is associated with the toy guitar 104 to enhance the resemblance of the toy guitar 104 to that of an electric guitar 104. With further reference to FIG. 3, the first body portion 104*a* may also define a switch component through portion 186*a* and a volume component through portion 186*b*. The through portions 186*a*, 186*b* may extend through a complete thickness of the first body portion 104*a* and be configured to receive components of the toy guitar 104 that are operable to control one or more functions of the toy guitar 104, such as an on/off function and/or a volume control function (e.g., where the toy guitar 104 is configured to emit sounds). The first body portion 104*a* is also shown as including sound slots 107. The sound slots 107 may be arranged over an internal sound source of the toy guitar 104 to permit the emission of sound to an external environment.

Figure 6A:
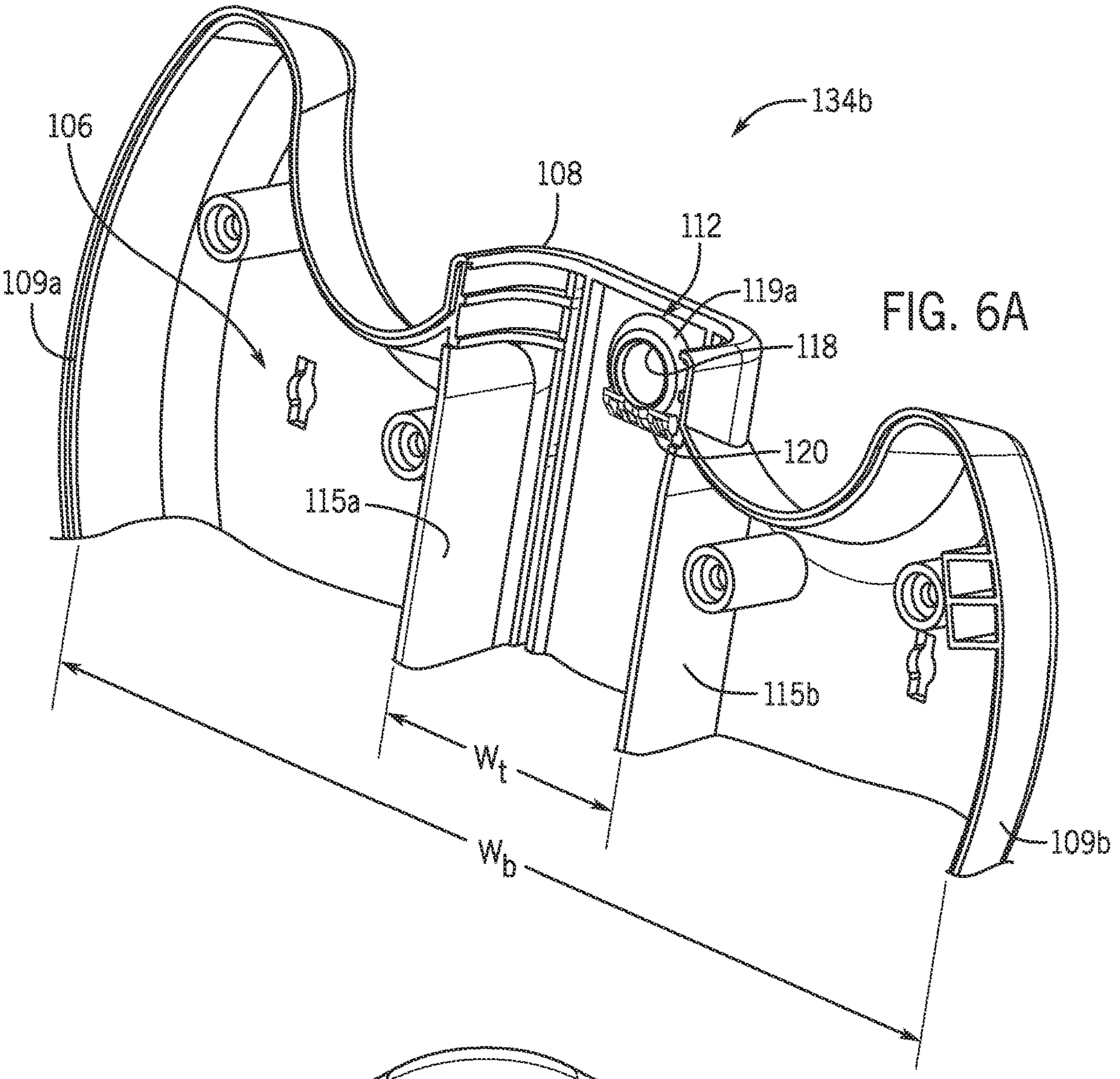
FIG. 6A depicts an interior view of a body portion toy guitar of FIG. 1A.

With reference to the second body portion 104*b*, a variety of features may be defined to accommodate components of the toy guitar 100, including the guitar neck 134, as described herein. For example, and with reference to FIG. 5, the second body portion may define or include or be associated with a track 114. The track 114 may be in the interior space 106 and configured to guide movements of the guitar neck 134 between the extended configuration A and the retracted configuration A'. In some cases, the track 114 may be integrally formed or coupled with the second body portion 104*b*. For example, the track 114 is shown within the interior space 106 and extending from the opening 108 to the bottom contour 109*c* or otherwise bottommost portion of the guitar body 104. The track 114 may define a generally linear path for the guitar neck 134 between the opening 108 and the bottom contour 109*c*. Further, the track 114 is shown in FIG. 5 as inset from the side contours 109*a*, 109*b*. In some cases, the track 114 may be inset from the side contours 109*a*, 109*b* such that a width $W_t$ of the track 114 is less than a width $W_b$ of the guitar body 104 at a ratio of at least 1:2, at least 1:3, at least 1:4 or other appropriate dimension, as shown in FIG. 6A. In this regard, the width $W_b$ may have a value of at least twice a value of the width $W_t$.

Figure 7A:
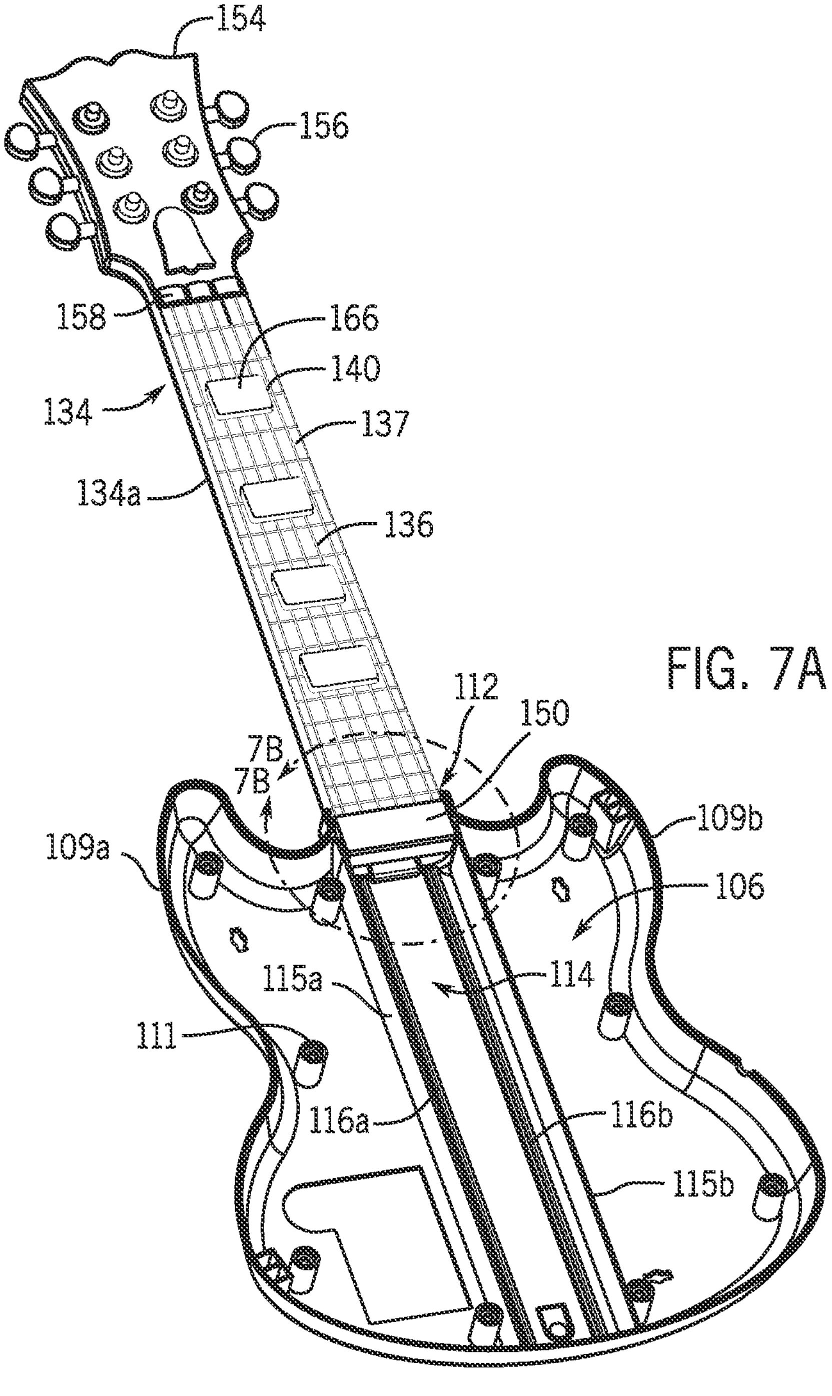
FIG. 7A depicts the body portion of FIG. 6A and a neck of the toy guitar of FIG. 1A.
Figure 7B:
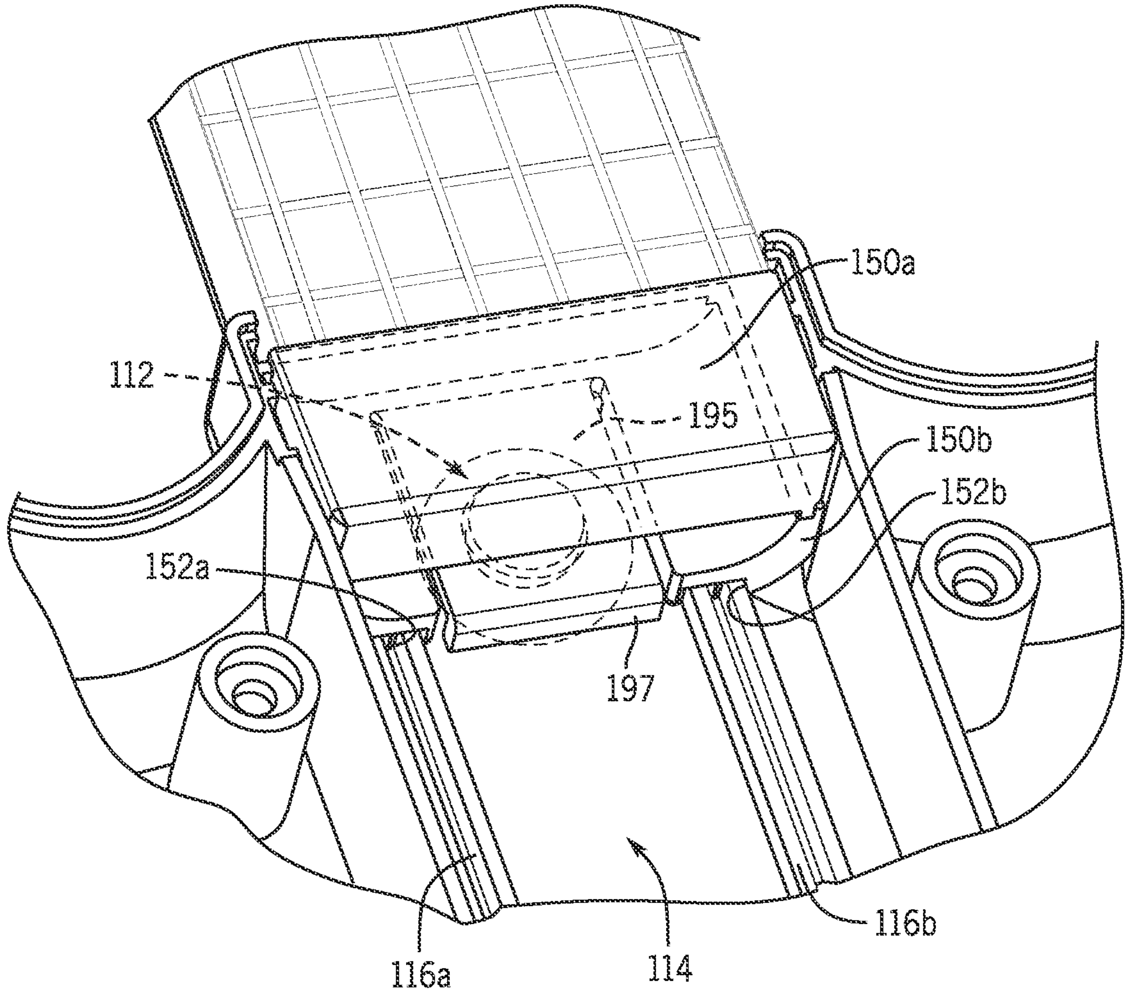
FIG. 7B depicts detail 7B-7B of FIG. 7A including a sled of the guitar neck engaged with a track of the body portion.

While many constructions of the track 114 are possible and contemplated herein, FIGS. 5, 6A, 7A show an example of the track 114 as including track walls 115*a*, 115*b*. The track walls 115*a*, 115*b* may be generally planar structures extending perpendicularly from an interior surface of the second body portion 104*b*. The width $W_t$ may be defined by a separation between the track walls 115*a*, 115*b*. The track 114 may further include at least one guide component between the track walls 115*a*, 115*b* that is configured for engagement with the guitar neck 134. As shown in FIG. 7B, the track 114 include a first guide component 116*a* and a second guide component 116*b*. The first and second guide components 116*a*, 116*b* may extend generally linearly down a run of the track 114. Each of the first and second guide components 116*a*, 116*b* may include one or more rails, protrusions, guides, or other features configured for engagement with the guitar neck 134. In the example of FIG. 7A, the first and second guide components 116*a*, 116*b* extend substantially parallel to one another generally adjacent respective ones of the track walls 115*a*, 115*b*. In other examples, other configurations are contemplated, including where the first or second guide components 116*a*, 116*b* extend along a subset of the run or length of the track 114.

Figure 6B:
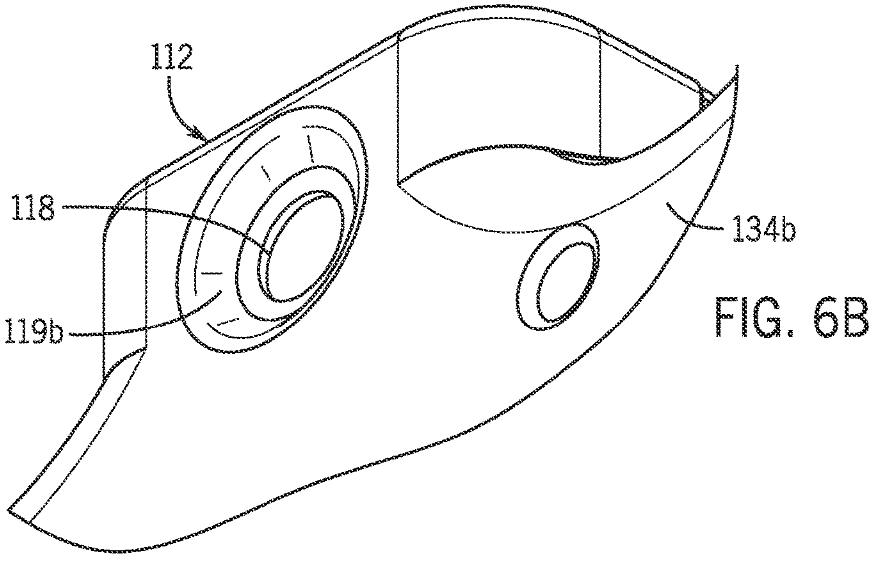
FIG. 6B depicts an exterior view of the body portion of FIG. 6A.

With reference to FIGS. 6A and 6B, the second body portion 104*b* may further define or include a holding feature 112. The holding feature 112 may be a feature of the guitar body 104 that is configured for engagement with a complimentary feature of the guitar neck 134, such as a retention structure of the guitar neck, as described herein. In this regard, the holding feature 112 may be configured to engage one or more components of the guitar neck 134 and define or secure a position of the guitar neck 134 relative to the guitar body 104, such as temporarily securing the guitar neck 134 at the extended configuration A. In the example of FIGS. 6A and 6B, the holding feature 112 may define an opening 118. The opening 118 may extend through a complete thickness of the first body portion 104*a* and be configured to receive a structure of the guitar neck 134. The opening 118 may be surrounded by a raised edge 119*a* at an interior surface of the guitar body 104 defined by the second body portion 104*b*. The second body portion 104*b* may further include a ladder 120 along one side of the raised edge 119*a*. The raised edge 119*a* and the ladder 120 may cooperate to guide a detent or other feature into the opening 118. For example, the ladder 120 may facilitate the flexing of the detent or other flexible component such that flexible component passes over the raised edge 119*a* and into the opening 118.

Once received in the opening 118, the raised edge 119*a* may restrain the detent from exit from the opening 118. As shown in FIG. 6B, the opening 118 may be surrounded by a recessed edge 119*b* at an exterior surface of the guitar body 104 defined by the second body portion 104*b*. The recessed edge 119*b* may a complimentary edge 119*a* to that of the raised edge 119*a*. The recessed edge 119*b* may facilitate the engagement of the detent or other feature received in the opening 118 by a user, as described herein.

The second body portion 104*b* is further shown as including a plurality of posts 111, as shown in FIGS. 5 and 6A. The plurality of posts 111 may be configured to receive a fastener or other component that connects or secures the first and second body portions 104*a*, 104*b* to one another. For example, a screw may be advanced from the exterior surface defined by the second body portion 104*b* through one of the plurality of posts 111, with a tip of the screw engaged with the first body portion 104*a* at an interior surface defined by the first body portion 104*a*. With reference to FIG. 1B, the second body portion 104*b* is also shown as including a battery drawer 105. The battery drawer 105 may provide access to the interior space 106 for the addition or removal of batteries 103 or other power source. The battery drawer 105 may be secured to the guitar body 104 via a faster or other device.

Turning to the guitar neck 134, this feature of the toy guitar 104 may include a first neck portion 134*a* and a second neck portion 134*b*, as shown in FIG. 5. The first and second neck portions 134*a*, 134*b* may be coupled to one another to define the neck portion 134. The first and second neck portions 134*a*, 134*b* may be halves or shell components. The first and second neck portions 134*a*, 134*b* may be coupled to one another and define a neck interior 135. The neck interior 135 may be configured to house a variety of components of the toy guitar 104, including electrical components of an input assembly, as described herein. As shown in FIGS. 1A and 4, the first neck portion 134*a* may define a fretboard 136 including frets 137. The fretboard 136 and frets 137 may be arranged along the exterior surface defined by the first neck portion 134*a* in order to mimic the components of a genuine musical instrument. The first neck portion 134*a* may further include a plurality of button slots 140 disposed along a length of fretboard 136. The button slot 140 may extend through a complete thickness of the first neck portion 134*a* and be configured to receive one or more components of a button assembly or other feature of the toy guitar 100 that is configured to receive a user input. As further shown in FIG. 5, the first neck portion 134*a* include a plurality of key holes 142. The plurality of key holes 142 extend through a complete thickness of the first neck portion 134*a* and are configured to receive one or more feature of the guitar that contribute to appearance of the guitar as an electric or acoustic guitar.

The first and second neck portions 134*a* 134*b* may cooperate to define the guitar neck 134 in a manner that resembles an acoustic or electric guitar. In this regard, and as shown in FIG. 1A, the first and second neck portions 134*a*, 134*b* may be coupled to one and other and define a headstock 154. The plurality of key holes 142 are defined at the head stock 154. A faux tuning key assembly 156 may also be included. The faux tuning key assembly 156 may be arranged within the neck interior 135 with individual tuning keys positioned in and protruding from individual ones of the plurality of key holes 142. The first neck portion 134*a* may further define a nut 158 to further imitate the features of an acoustic or electric guitar.

The guitar neck 134 may include a variety of features to facilitate engagement of the guitar neck 134 with the guitar body 104. For example, and with reference to FIG. 7A, the guitar neck 134 may include a sled portion 150 that is configured to engage the guitar body 104. The sled portion 150 may be an end portion of the guitar neck 134 opposite the headstock 154. The sled 150 may be defined by both the first neck portion 134*a* and the second neck portion 134*b*. As shown in FIG. 7B, the sled portion 150 may include a first sled portion 150*a* defined by or otherwise extending from the first neck portion 134*a*. The sled portion 150 may further include a second sled portion 150*b* that is defined by or otherwise extending from the second neck portion 134*b*. The second sled portion 150*b* may define a series of follower components 152. The series of follower component 152 may be cuts, recess, grooves, or other feature configured to engage a guide component of the track 114. In the example of FIG. 7B, the series of follower components 152 includes two sets of two longitudinal recess extending along a longitudinal direction of the guitar neck 134.

The sled 150 may further include a retention structure 138, also referred to as an extend retention structure 138. The retention structure 138 may be a flexible component of the guitar neck 134 configured to engage the guitar body 104. With reference to FIG. 7B, the retention structure 138 may be configured to flex or bend, elastically, relative to the second sled portion 150*b*. With reference to cross-sectional views of FIGS. 8A-8C, the retention component may include a detent 113. The detent 113 may be or include a protrusion that extends from a surface or tab of the retention structure 138. The detent 113 may be sized to match a size of the opening 118. For example, the detent 113 may have a width or other cross dimension that is similar to or slightly less than a cross-dimension of the opening 118. Further, the detent 113 may have a height that allows the detent to slightly protrude from an exterior surface of the second body portion 104*b* when the detent 113 is received by the opening 118. The detent 113 may define an input surface 113*a*. The input surface 113*a* may be configured to receive a force input $F_1$ that causes the detent 113 to flex, elastically, relative to the second sled portion 150*b*. The retention structure 138 and detent 113 may also define a lock or stop that mitigates the ability to remove the guitar neck 134 from the guitar body 104. For example, in the event that the guitar neck 134 is pulled from the guitar body 104 beyond the extended configuration A, the retention structure 138 and detent 113 may catch an interior edge or other feature of the second body portion 104*b* in order to prevent exit of the guitar neck 134 from the guitar body 104.

With reference to FIG. 1A, the toy guitar 100 may include a variety of peripheral components or accessories. Some accessories may be primarily aesthetic and contribute to the resemblance of the toy guitar as resembling an acoustic or electric guitar. Other components may be functional, such as components that are configured to control an on/off state of the toy guitar 100, as one example. Without limitation, the toy guitar 100 may include faux pickups 191, a faux pickup selector 192, a volume knob 193, a jack 194, and a switch 196. The faux pickups 191 and the faux pick selector 192 may coordinate with the fretboard 136 and faux tuning assembly 156 to contribute to the appearance of the toy guitar 104 as an electric acoustic guitar. The volume knob 193 may be configured to receive a user input and cause a sound volume of the toy guitar 104 to be altered. The switch 196 may be configured to receive a user input and cause the toy guitar 100 to transition between an on/off state. The jack 194 may be an audio jack for headphones; which may or may not be functional, based on a given application. The toy guitar 100 may also include a cover 110, as shown in FIG. 1A. The cover 110 may be a translucent component that allow the propagation of light therethrough. In this regard, the cover 110 may be used the physically shield lights or other component from debris while permit the light to propagate through the cover 110 such that a user may observe the light on an exterior of the toy guitar 100. In some cases, the cover 110 may be adapted to enclose the electronics tray 182 described herein.

The toy guitar 100 may further include an input assembly 160, as shown in FIG. 5. Broadly, the input assembly 160 may be integrated with the guitar neck 134 and configured to cause the toy guitar 100 to emit a light or a sound upon a receipt of an input when the guitar neck 134 is in the extended configuration A. The input assembly 140 may be electrically uncoupled with a power source of the toy guitar 100 with the guitar neck 134 is manipulated from the extended configuration A. To facilitate the foregoing, the input assembly 160 is show in FIG. 5 is including a board 162, such as a printed circuit board, a plurality of switches 164, and a corresponding plurality of button pieces 166. As used herein, a pair of a switch of the plurality of switches 164 and a button piece the plurality of button pieces 166 may define a button assembly. The plurality of button pieces 166 may be a key, a plate, raised feature or other structure configured to receive a force input. The plurality of button pieces 166 may be sized to correspond to a size of the plurality of button slots 140. An underside of the plurality of button pieces may be configured for engagement with a corresponding switch of plurality of switches 164. The plurality of switches 164 may include mechanical switches that are configured to complete an electric circuit upon a force input of the switch, such as that caused by a depression of a corresponding button piece. The plurality of switches 164 may be integrated with the board 162 such that completion of the electric circuit by the respective switch cause the board to transmit one or more electric signals and/or carry out one or process signal processing operations that causes the emission of a light or a sound by the toy guitar 100.

Additional components of the input assembly 160 are illustrated with respect to FIG. 7B. For example, the guitar neck 134 may include a neck electrical coupling 168 and a neck connector 169. The neck electrical coupling 168 may be a contact or electrode or other structure that is configured to mechanical complete an electrical circuit. The neck connector 169 may establish an electrical path between the neck electrical coupling 168 and the board 162. As further shown in FIG. 7B, the guitar body 104 may include a body electrical coupling 170, a body connector 171, and a light assembly 184. The body electrical coupling 170 may be a contact or electrode or other structure that is configured to mechanically complete an electrical circuit. The body connector 171 may establish an electrical path between the body electrical coupling 170 and the light assembly 184. The light assembly 184 may include a plurality of lights that are actuateable using the input assembly 160. The guitar body 104 may also include a speaker 199 (FIG. 5) that is actuateable using the input assembly 160.

The toy guitar 100 may be coupled such that guitar neck 134 is manipulateable between the extended configuration A (FIG. 1A) and the retracted configuration A' (FIG. 2). For example, and with reference to FIGS. 7A and 7B, the guitar neck 134 may be received partially into the interior footprint 106 and seated in the track 114. The guitar neck 134 may be seated in the track 114 with the track walls 115*a*, 115*b* arranged on either side of the guitar neck 134. The guitar neck 134 may be coupled to the track 114 using the sled portion 150. For example, the sled portion 150 may be received in the track 114 between the track walls 115*a*, 115*b* and engaged with one or more guide components of the track 114. The one or more guide components of the track may direct the guitar neck 134 along a generally linear path of the track 114 from the opening 108 to the bottom portion 109*c* of the guitar body 104.

In one example, as illustrated in FIG. 7B, the follower components 152*a*, 152*b* may be engaged with the guide components 116*a*, 116*b*. For example, the follow components 152*a*, 152*b*, may be configured for complimentary engagement with the guide components 116*a*, 116*b*. As shown in FIG. 7B, the protrusions of rails of the guide components 116*a*, 116*b* may be received into corresponding ones of the follower components 152*a*, 152*b*. The guitar neck 134 and the guitar body 104 may be coupled such that the follower components 152*a*, 152*b* and the guide components 116*a*, 116*b* maintain an engagement with one another as the guitar neck 134 is advanced along the track 114.

Figure 8A:
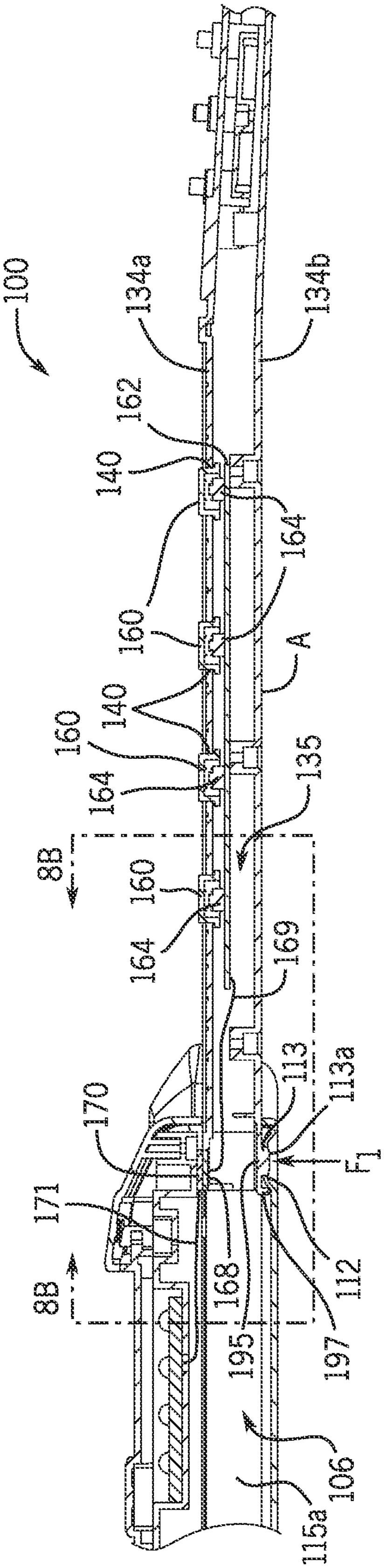
FIG. 8A depicts a cross-sectional view of the toy guitar of FIG. 1A, taken along line 8A-8A of FIG. 1A.

The toy guitar 100 may be further coupled such that the input assembly 160 is integrated at least partially into the guitar neck 134. With reference to FIGS. 5 and 8A, the input assembly 160 may be positioned within the neck interior 135. For example, the board 162 may be arranged in the neck interior 135 extending along the longitudinal direction of the neck 134. The plurality of switches 164 may be coupled to the board 162. The plurality of button pieces 166 may connected to corresponding ones of the plurality of switches 164. Each respective button piece of the plurality of button pieces 166 may be positioned in a given one of plurality of button slots. The respective button piece may be positioned within a respective button slot and protrude from the fretboard 136. The plurality of button pieces 166 may be coupled such that each button piece is capable of movement toward the switch in response to a force input to actuate the respective switch. When the force of the force input ceases, the button piece may return to the initial position.

Figure 8B:
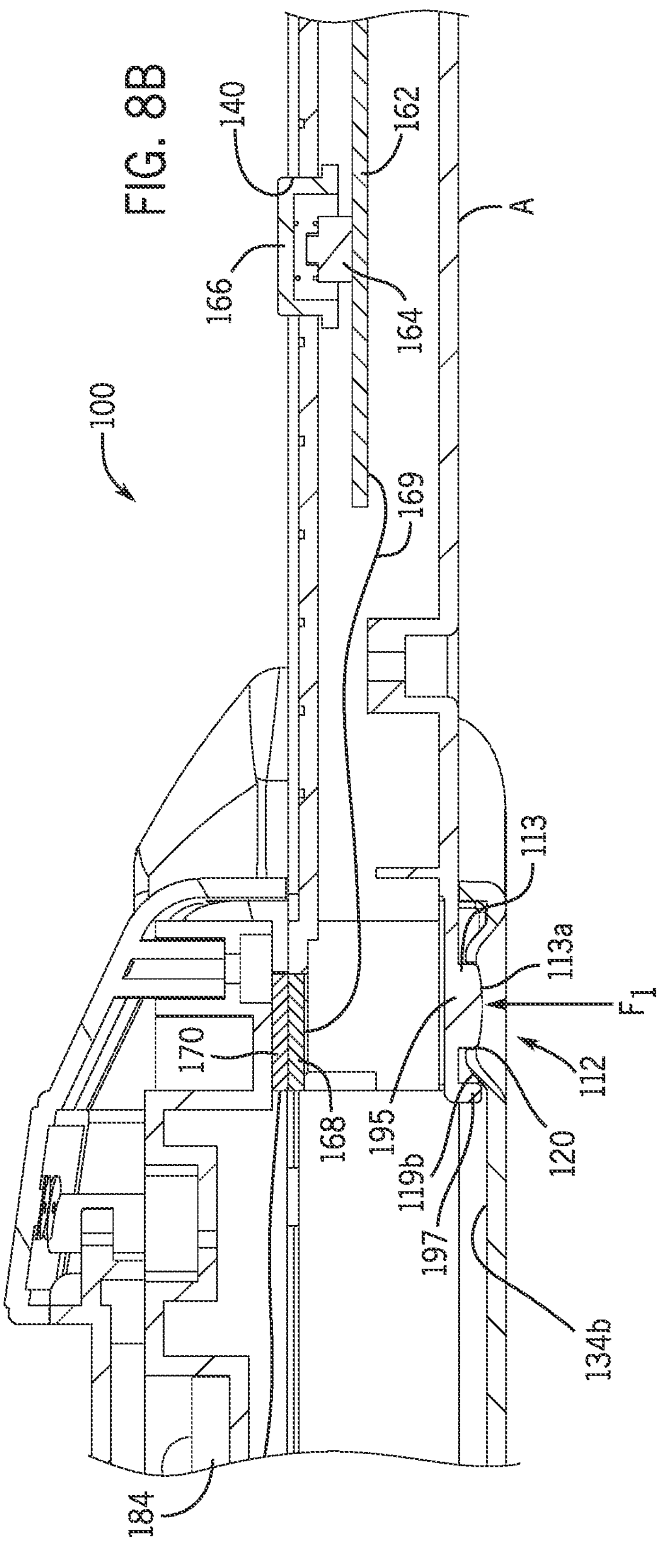
FIG. 8B depicts detail 8B-8B of FIG. 8A including an electric coupling of electrical components of a neck and a body of the toy guitar of FIG. 1A.

With reference to the cross-sectional view of FIG. 8B, the neck electrical coupling 168 may be integrated with the guitar neck 134 at the sled portion 150. The sled portion 150, including the neck electrical coupling 168, may remain generally within the interior space 106 in each of the extended configuration A and the retracted configuration A'. The neck connector 169 may define an electrical connection between the neck electrical coupling and the board 162. The body electrical coupling 170 may be integrated with the guitar body 104. In one example, the body electrical coupling 170 may be integrated with the guitar body 104 via a mounting to the first body portion 104*a*. The body electrical coupling 170 may be mounted to the first body portion 104*a* at a position that is generally aligned with the neck electrical coupling 168 when the guitar neck 134 is in the extended configuration A. The light assembly 184 may be coupled to the guitar body 104 via the electronics tray 182. For example, the light assembly 184 may be seated in the electronics tray 182 and covered by the cover 110. The body connector 171 may define an electrical coupling between the light assembly 184 and the body electrical coupling 170. The body electrical connector 171 may also extend to and/or otherwise be electrically coupled with the speaker 199, the batteries 103, the volume knob 193, the switch 196 and/or other electrical components of the guitar body 104.

Figure 9A:
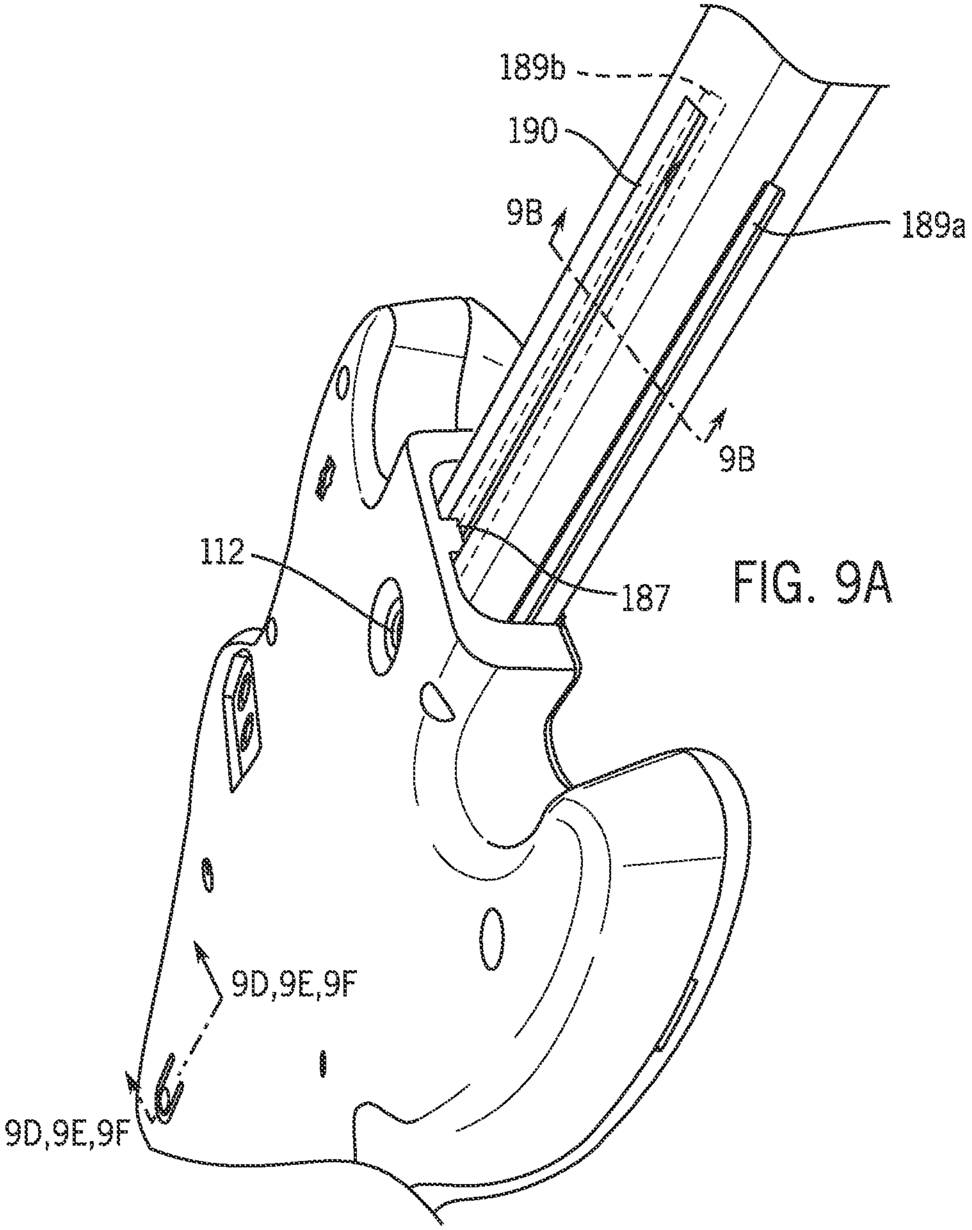
FIG. 9A depicts a bottom isometric view of the toy guitar of FIG. 1A.
Figure 9B:
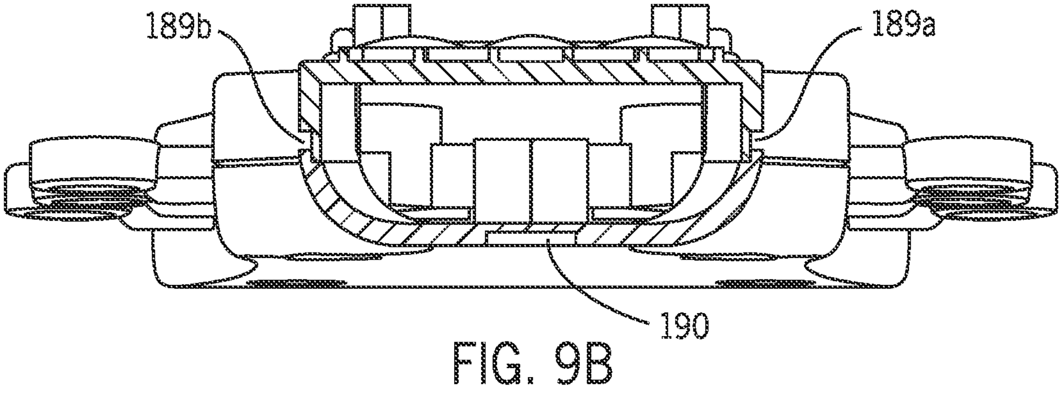
FIG. 9B depicts a cross-sectional view of the toy guitar of FIG. 1A, taken along line 9B-9B of FIG. 9A.

With reference to FIGS. 9A and 9B, the guitar body 104 may include a body tang 187. For example, the second body portion 104*b* may include the body tang 187. The body tang 187 may contact the guitar neck 134. The guitar neck 134 may further define or include at least one groove. For example, the guitar neck 143 may define or include a groove 190, a first side groove 189*a*, and a second side groove 189*b*. The groove 190 and the first and second side grooves 189*a*, 189*b* may each extend along a longitudinal direction of the guitar neck 134. The groove 190 and the first and second side grooves 189*a*, 189*b* may each engage with the guitar body 104. For example, the groove 190 may engage with the body tang 187 to assist alignment of the guitar neck 134 and the track 114 and help ensure smooth extension/retraction movement of the guitar neck 134. For example, the groove 190 may slidably couple with the body tang 187 to direct the guitar neck 134 between the extended configuration A and the retracted configuration A'. The body tang 187 may be configured to stop or limit the guitar neck 134 from extending out of the guitar body 104 completely. For example, the body tang 187 may engage with an end of the groove 190 so as to halt the guitar neck 134 and prevent the guitar neck 134 from sliding or extending further. The body tang 187 may be configured to stop the guitar neck 134 from retracting into the guitar body 104 completely. For example, the body tang 187 may engage with another end of the groove 190 so as to halt the guitar neck 134 and prevent the guitar neck 134 from sliding or retracting further.

Figure 9C:
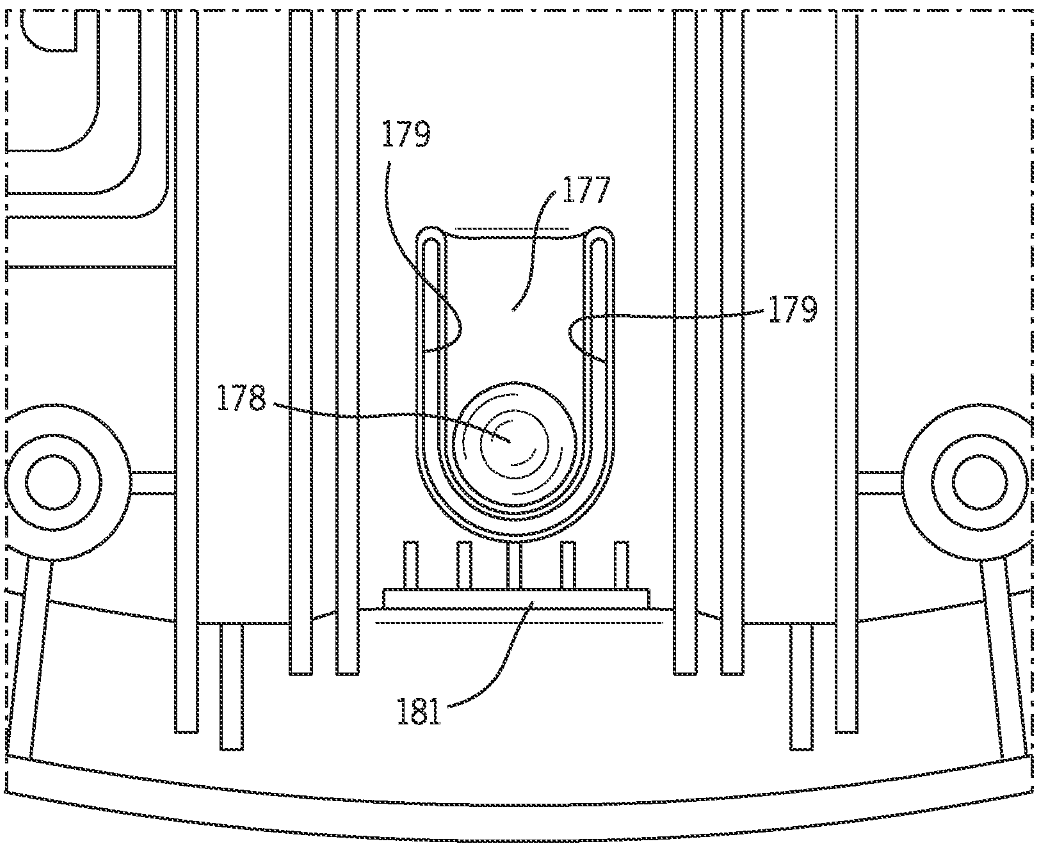
FIG. 9C depicts an interior view of a body portion of the toy guitar of FIG. 1A.

With reference to FIG. 9C, the guitar body 104 may further define or include a body retainer 177. For example, the second body portion 104*b* may define or include the body retainer 177. The body retainer 177 may be flexible. The body retainer 177 and the second body portion 104*b* may define or include a clearance 179. For example, the clearance 179 may facilitate the flexing of the body retainer 177 in conjunction with an input force $F_2$, as shown in FIG. 9E. The clearance 179 may extend through a complete thickness of the second body portion 104*b*. For example, the clearance 179 may be defined as a space between the body retainer 177 and the second body portion 104*b* such that the body retainer 177 may bend or flex. The body retainer 177 may be a feature of the guitar body 104 configured for engagement with a complimentary feature of the guitar neck 134, such as the input surface 113*a* of the detent 113. The body retainer 177 may define a body input surface 178. The body input surface 178 may be configured for engagement with the input surface 113*a*. For example, the body input surface 178 may be configured to receive the input force shown in FIG. 9E to facilitate the flexing of the body retainer 177 such that the body input surface 178 engages with the input surface 113*a*.

The guitar body 104 may further define or include a ridge 181. The ridge 181 may extend outward from the interior surface of the guitar body 104 defined by the second body portion 104*b*. The ridge 181 may engage with one or more components of the guitar neck 134, as described herein. For example, the ridge 181 may engage with the guitar neck 134 to define or secure a position of the guitar neck 134 relative to the guitar body 104, such as temporarily securing the guitar neck 134 at the retracted configuration A'.

Figure 9D:
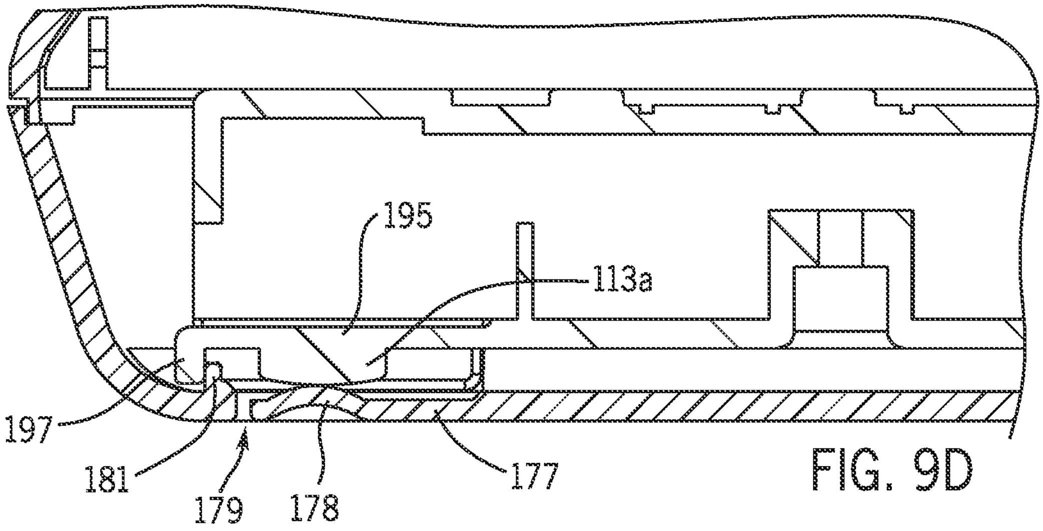
FIG. 9D depicts a cross-sectional view of the toy guitar of FIG. 2, taken along line 9D-9D of FIG. 9A.
Figure 9E:
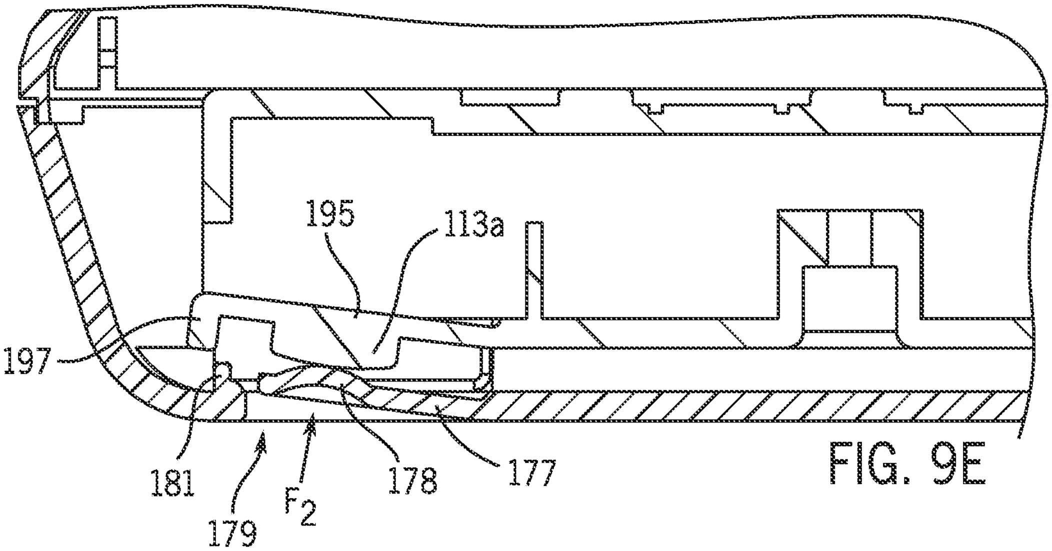
FIG. 9E depicts a cross-sectional view of the toy guitar of FIG. 2, taken along line 9E-9E of FIG. 9A.
Figure 9F:
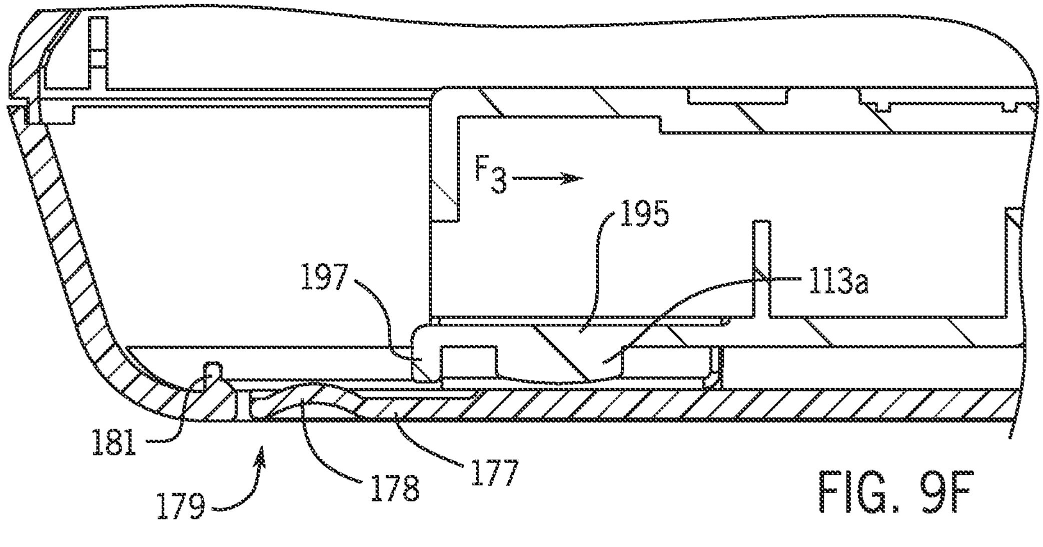
FIG. 9F depicts a cross-sectional view of the toy guitar of FIG. 1A, taken along line 9F-9F of FIG. 9A.

With reference to FIGS. 9D-F, the guitar neck 134 may further define or include a second retention structure 195, also referred to as a retract retention structure 195. The second retention structure 195 may include or define the detent 113 and the input surface 113*a*. For example, the detent 113 may protrude from the second retention structure 195. The second retention structure 195 may be a flexible component of the guitar neck 134 configured to engage the guitar body 104. For example, the body input surface 178 may engage with the input surface 113*a* of the detent 113 to facilitate the flexing of the second retention structure 195. The body retainer 177 and the second retention structure 195 may cooperate to restrain the guitar neck 134 in the retracted configuration A'. The body retainer 177 and the second retention structure 195 may cooperate to actuate the guitar neck 134 from the retracted configuration A' to the extended configuration A.

The second retention structure 195 may include or define a tang 197. The tang 197 may restrain the guitar neck 134 in the retracted configuration A'. For example, the tang 197 may engage with the ridge 181 in the retracted configuration A' such that the guitar neck 134 does not slide to the extended configuration A, as shown in FIG. 9D. The tang 197 may be raised with the second retention structure 195. For example, the body input surface 178 may be configured to facilitate the engagement and the flexing of the body retainer 177 and the second retention structure 195 such that the tang 197 is raised, as shown in FIG. 9E. The tang 197 and the second retention structure 195 may cooperate to guide the tang 197. For example, another force $F_3$ in the longitudinal direction of the guitar neck 134 may facilitate the second retention structure 195 to slide to the extended configuration A such that the tang 197 passes over the ridge 181, as shown in FIG. 9F.

Figure 10:
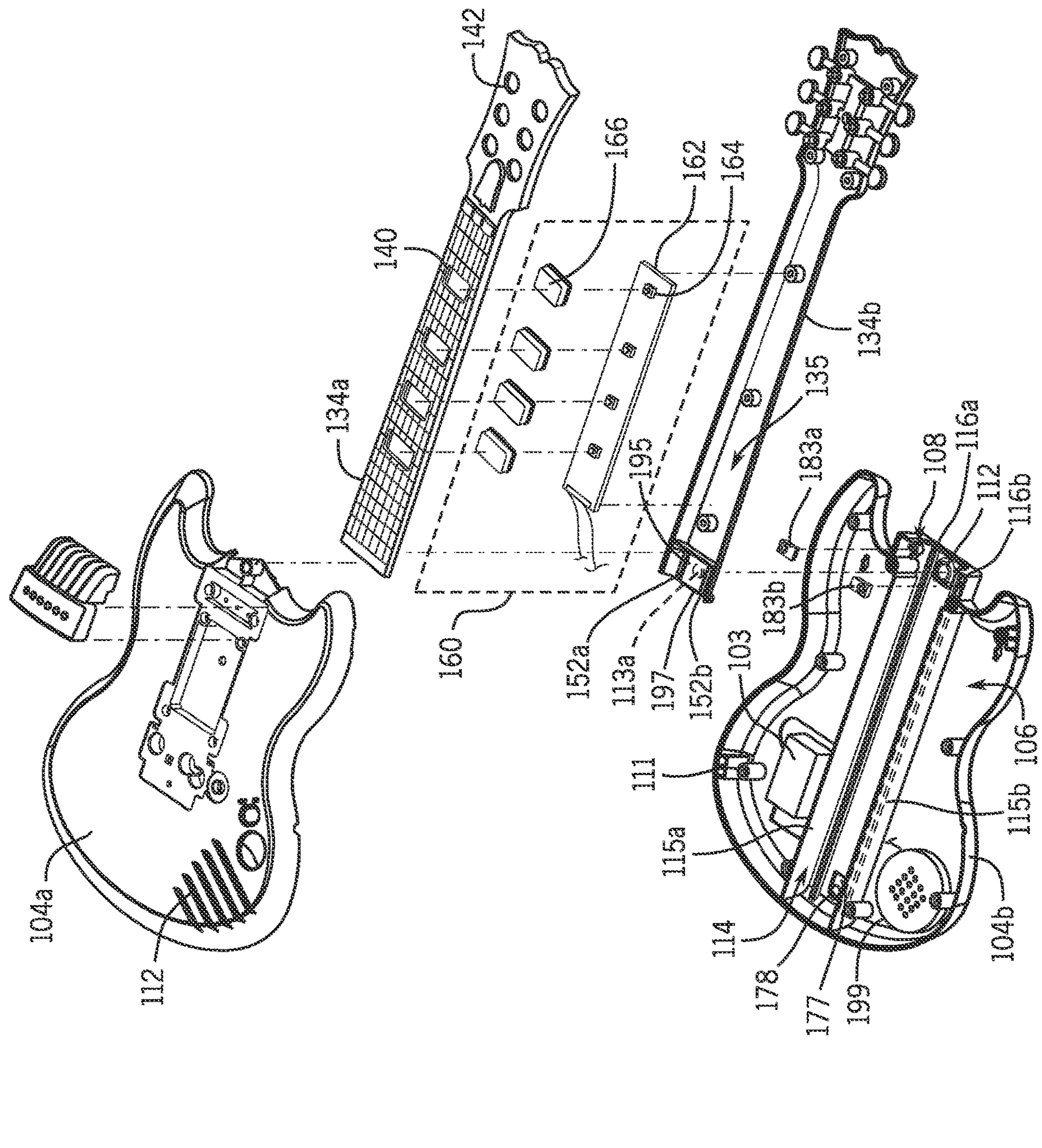
FIG. 10 depicts another exploded view of the toy guitar of FIG. 1A.

With reference to FIG. 10, the toy guitar 100 may include a first retainer 183*a* and a second retainer 183*b*. The first and second retainers 183*a*, 183*b* may be coupled with the second body portion 104*b*. For example, the first and second retainers 183*a*, 183*b* may be screwed, welded, glued, or otherwise fixed to the second body portion 104*b*. The first and second side grooves 189*a*, 189*b* may engage with the first and second retainers 183*a*, 183*b*, respectively. For example, the first and second side grooves 189*a*, 189*b* may be configured for complimentary engagement with the first and second retainers 183*a*, 183*b* to assist alignment of the guitar neck 134 and the track 114. The first and second retainers 183*a*, 183*b* may be received into the first and second side grooves 189*a*, 189*b*. The guitar neck 134 and the guitar body 104 may be coupled such that the first and second side grooves 189*a*, 189*b* and the first and second retainers 183*a*, 183*b* maintain an engagement with one another as the guitar neck 134 is advanced along the track 114. For example, the first and second side grooves 189*a*, 189*b* may slidably couple with the first and second retainers 183*a*, 183*b*, respectively, to direct the guitar neck 134 between the extended configuration A and the retracted configuration A'.

The first and second retainers 183*a*, 183*b* may be configured to stop the guitar neck 134 from extending out of the guitar body 104 completely. For example, the first and second retainers 183*a*, 183*b* may engage with an end of the first and second side grooves 189*a*, 189*b* so as to halt the guitar neck 134 and prevent the guitar neck 134 from sliding or extending further. The first and second retainers 183*a*, 183*b* may be configured to stop the guitar neck 134 from retracting into the guitar body 104 completely. For example, the first and second retainers 183*a*, 183*b* may engage with another end of the first and second side grooves 189*a*, 189*b* so as to halt the guitar neck 134 and prevent the guitar neck 134 from sliding or retracting further.

Figure 11:
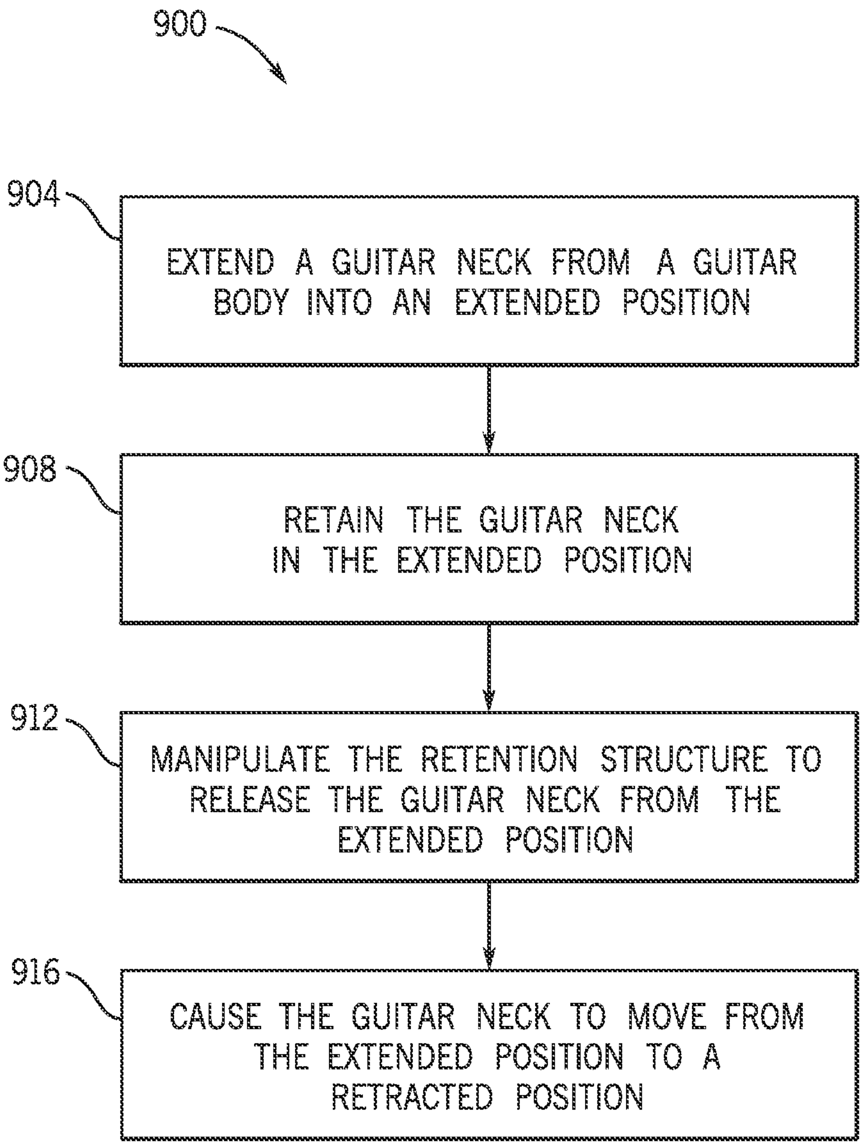
FIG. 11 depicts a flow diagram for expanding a toy guitar.

In operation, the guitar neck 134 may be extended from the guitar body 104 into the extended configuration A, as shown at operation 904 of FIG. 11. By way of illustration, the sled portion 150 may be moved along the track 114 from the bottommost portion of the guitar body 104 and toward the opening 108. The movement of the sled portion 150 may be guided in part by the walls 115*a*, 115*b*, for example, by mitigating stray lateral movements of the sled portion 150 within the track 114. The movement of the sled portion 150 may be further guided in part by the complimentary engagement of the guide components 116*a*, 116*b* and the follower components 152*a*, 152*b*. For example, the follower components 152*a*, 152*b* may receive the guide components 116*a*, 116*b* to stabilize the movement of sled portion 150 as the sled portion 150 advances along the track 114. In this manner, the guitar neck 134 may be aligned in the guitar body 104, thereby allowing for a user or consumer to merely pull the guitar neck 134 from the guitar body 104 to move the guitar neck 134 to the extended configuration A. As the guitar neck 134 is pulled by the user or consumer, the guitar neck 134 will continue to extend until the end portions of the first and second side grooves 189*a*, 189*b* of the guitar neck 134 engage with the first and second retainers 183*a*, 183*b*, respectively. This operation may facilitate ease of use, especially as compared to toys that are or arrive in a disassembled state prior to use. This operation may further more readily allow the toy guitar 104 to be tested and prepared or manipulated to the extended configuration A, as compared with toys that are or arrive in a disassembled state.

In further reference to FIG. 11, at operation 908, the guitar neck 134 is retained in the extended configuration A. For example, and with reference to FIGS. 6A and 8B, the detent 113 of the retention structure 138 may be flexed or bent via engagement with the ladder 120. For example, the movement of the sled portion 150 along the track 114 may cause the detent 113 to contact the ladder 120. The presence of ladder 120 along the path of movement of detent 113 may cause the detent to bend or flex relative to the remained or the second sled portion 150*b*. The detent 113 may continue along the track 114 in the flexed state until the detent 113 reaches the opening 118. At the opening, the detent 113 may be free to return to an undeformed state. For example, the detent 13, no longer constrained by the ladder 120, may expand from the deformed state and enter or pop into the opening 118. With the detent 113 received in the opening 118, the guitar neck 134 may be prevented from moving along the track 114.

At operation 912, the retention structure 138 is manipulated to release the guitar neck 134 from the extended configuration A. For example, and with reference to FIG. 8B, the detent 113 may receive a force input $F_1$ at the input surface 113*a*. The force input $F_1$ may cause the detent to bend or flex sufficient to remove the detent 113 from the opening 118. With the detent 113 removed from the opening 118, the guitar neck 134 may be free to move along the track 114, such as moving along the track 114 to the retracted configuration A'.

At operation 916, the second retention structure 195 is manipulated to cause the guitar neck 134 to move from the extended configuration A to the retracted configuration A'. For example, and with reference to FIGS. 9D-9F, the guitar neck 134 is guided along the track 114 until the tang 197 of the second retention structure 195 contacts and passes over the ridge 181 of the guitar body 104. At which point the tang 197 may restrain the guitar neck 134 in the retracted configuration A'. For example, the tang 197 may engage with the ridge 181 in the retracted configuration A' such that the guitar neck 134 does not slide to the extended configuration A, as shown in FIG. 9D.

In operation, the toy guitar 100 may be configured to emit one or more lights or sounds in the extended configuration A. When the toy guitar 100 is transitioned from the extended configuration A, such as toward or into the retracted configuration A', the toy guitar 100 may be prevented from emitting lights and sounds. To facilitate the foregoing, the input assembly 160 may be configured to receive one or more user inputs that causes the speaker 199 to emit a sound and/or the light assembly 184 to emit one or more lights. As shown in FIG. 7B, in the extended configuration A, the input assembly 160 is electrically coupled to electrical components of the guitar body 104. For example, the neck electrical coupling 168 and the body electrical coupling 170 may be contacting one another when the guitar neck 134 is in the extended configuration A.

Figure 8C:
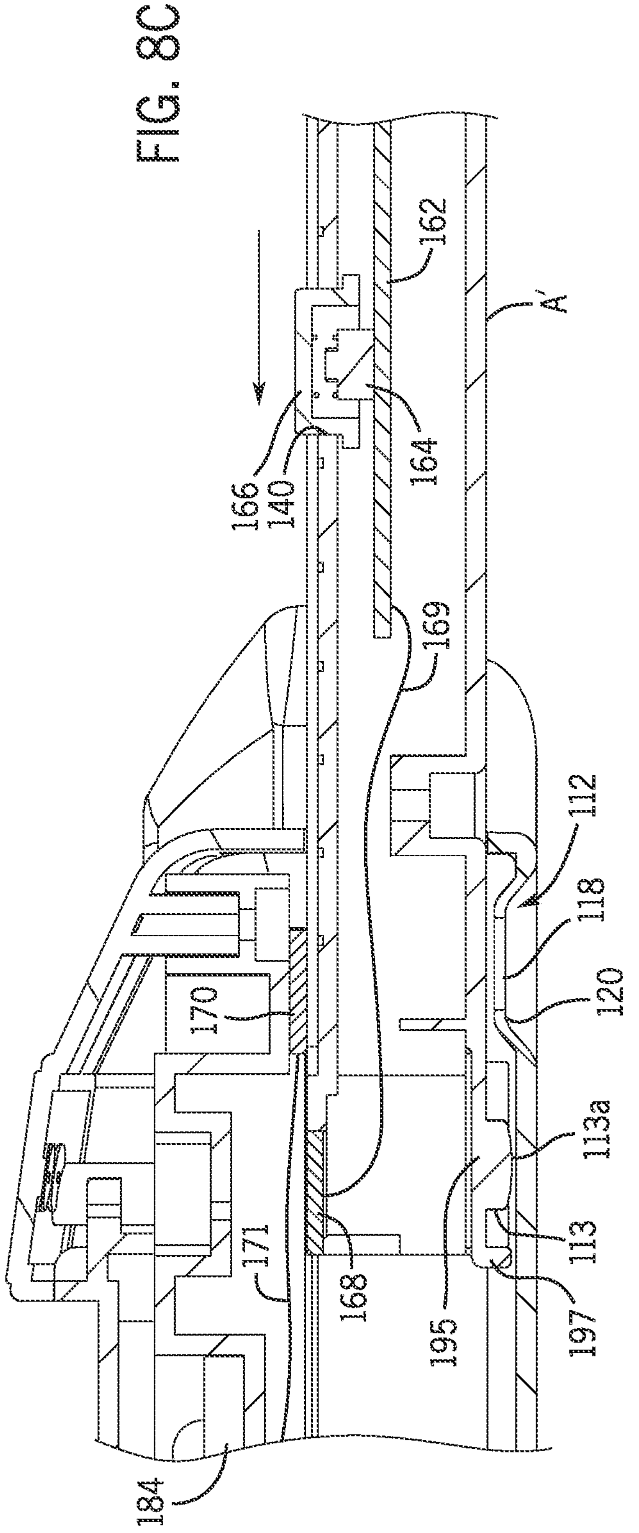
FIG. 8C depicts a cross-sectional view of the toy guitar of FIG. 2, taken along line 8C-8C of FIG. 2.

As shown in FIG. 8C, the guitar neck 134 may be transitioned from the extended configuration A in order to electrically uncouple the input assembly 160 from the electrical component of the guitar body 104. For example, movement of the guitar neck 134 away from the extended configuration A may cause the neck electrical coupling 168 to be physically displaced from the body electrical coupling 170, e.g., such as by a displacement 174 shown in FIG. 8C. The displacement of the neck electrical coupling 168 and the body electrical coupling 170 be sever the electrical coupling between the input assembly 160 and the electrical components of the guitar body 104. Accordingly, when the guitar neck 134 is moved away from the extended configuration A, such as toward or to the retracted configuration A', the input assembly 160 may no longer operate to cause the toy guitar 100 to emit light or sound, notwithstanding any inputs received at the button pieces 166. The input assembly 160 may be subsequently electrically coupled to the electrical components of the guitar body 104 may returning the guitar neck to the extended configuration A, as shown in FIG. 7B.

The expandable and retractable structures and techniques described above with reference to the toy guitar 100 may be implemented in variety of toys and other objects. Toys of various shapes, types, and functions may assume an excessive amount of space and/or otherwise be unwieldy for storage or display. Select portions of the toys (e.g., peripheral portions) may be adapted for expanding or retracting relative to a main portion of the toy in order to reduce a three-dimensional footprint of the toy. Reducing the three-dimensional footprint may further facilitate the shipment and retail display of the toy such that the toy occupies a lesser amount of space during shipment of retail display. The user may then manipulate the toy to an expanded configuration for use.

Figure 12A:
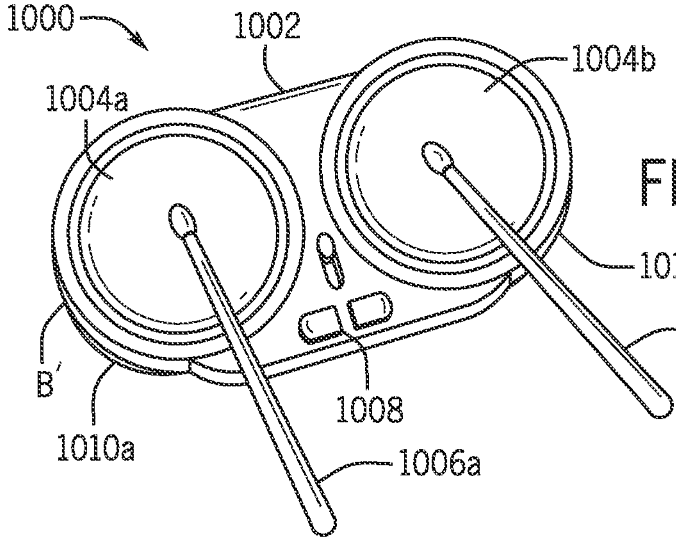
FIG. 12A depicts a toy drum set in a first configuration.
Figure 12B:
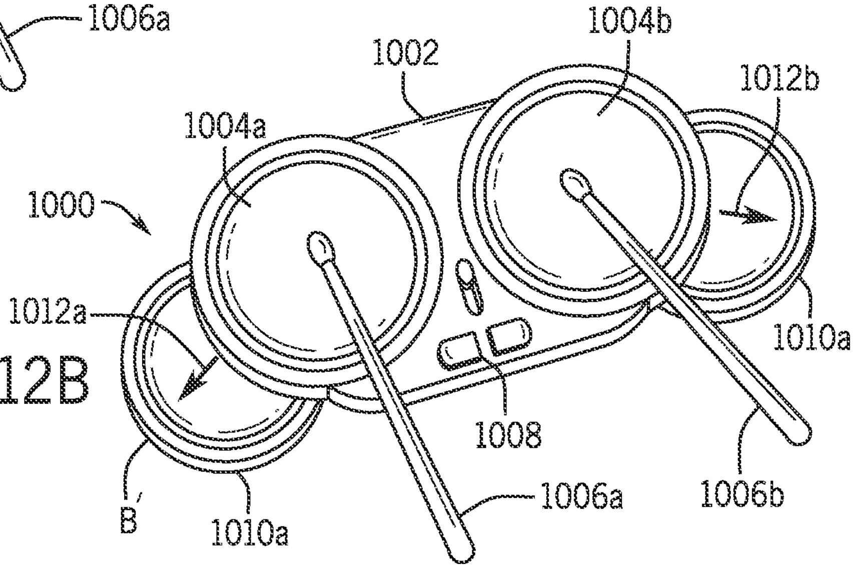
FIG. 12B depicts the toy drum set of FIG. 12A in a transitional configuration.
Figure 12C:
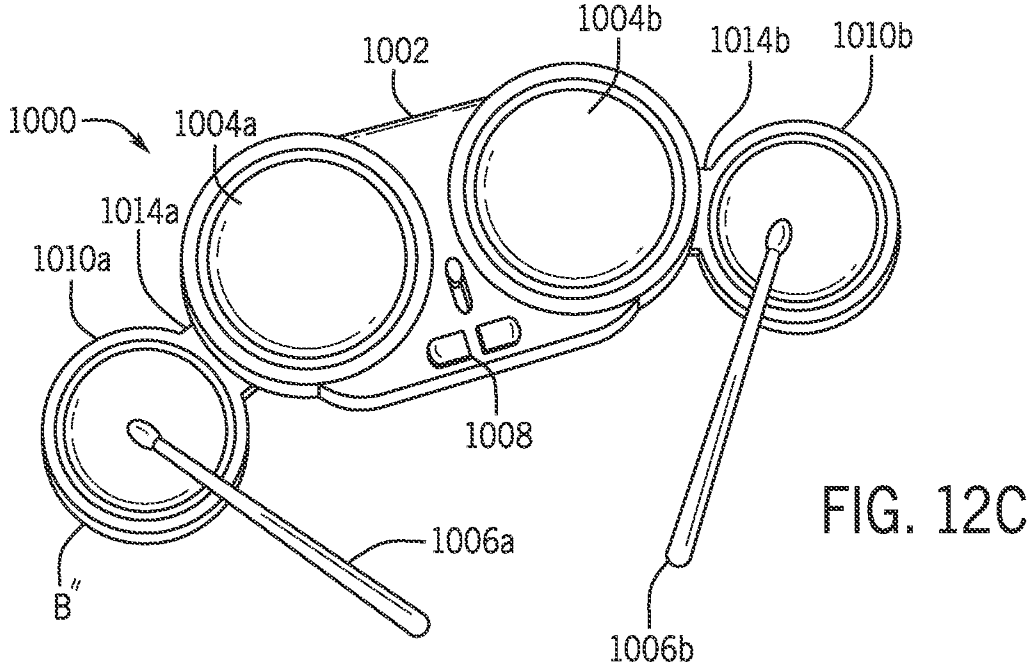
FIG. 12C depicts the toy drum set of FIG. 12A in a second configuration.

With reference to FIGS. 12A-12C, a toy drum set 1000 is depicted that is configured to transition between a retracted configuration B and an expanded configuration B", according to the systems and techniques described herein. The toy drum set 1000 may include a body portion 1002 with fixed drum pads 1004a, 1004b and controls 1008. FIG. 12A shows the toy drum set 1000 in a retracted configuration B, in which the fixed drum pads 1004a, 1004b are exposed to a user operating the toy drum set 1000, such as by hitting the fixed drum pads 1004a, 1004b with drum sticks 1006a, 1006b.

The body portion 1002 may be a main portion of the toy drum set 1000. The toy drum set 1000 may further include moveable drum pads 1010a 1010b. The moveable drum pads 1010a, 1010b may be at least partially received within the body portion 1002 in the retracted configuration B. The moveable drum pads 1010a, 1010b may include or be associated with engagement portions 1014a, 1014b, respectively. The engagement portions 1014a, 1014b may engage a track or other feature within the body portion 1002. In this regard, the moveable drum pads 1010a, 1010b may slide or move along expandable directions 1012a, 1012b, as may be guided by the respective engagement portions 1014a, 1014b and associated track within the body portion 1002. For example, the moveable drum pads 1010a, 1010b may slide or move along expandable directions 1012a, 1012b from the retracted configuration B (FIG. 12A) to a transitional configuration B' (FIG. 12B) to an expanded configuration B" (FIG. 12C). In the expanded configuration B", the moveable drum pads 1010a, 1010b may be fully exposed for operating the toy drum set with the drum sticks 1006a, 1006b. In some cases, the moveable drum pads 1010a, 1010b may be retained in the extended configuration B" using a retention structure, such as any of the retention structures described herein. Accordingly, the moveable drum pads 1010a, 1010b may be further manipulated form the expanded configuration B" to the retracted configuration B as needed.

Figure 13A:
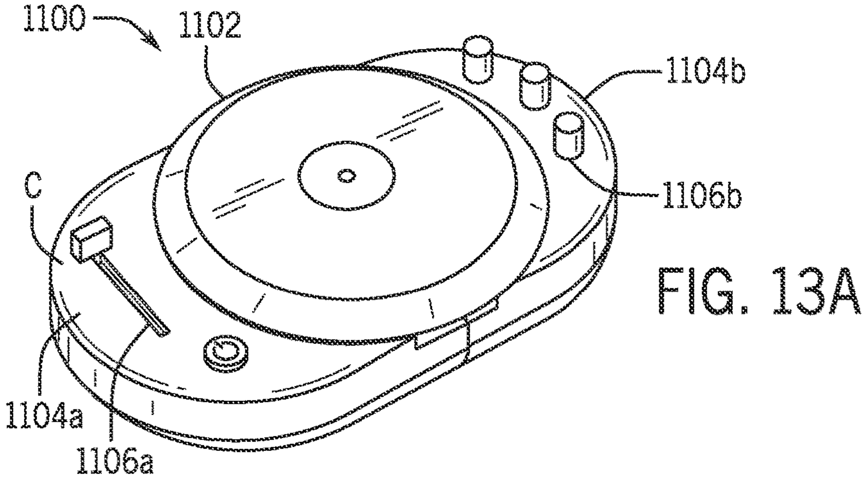
FIG. 13A depicts a toy DJ mixer in a first configuration.
Figure 13B:
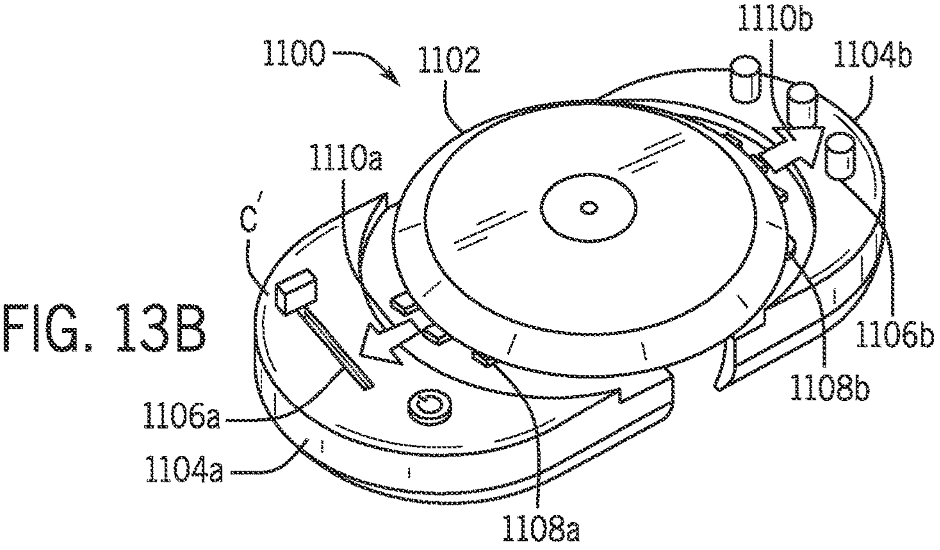
FIG. 13B depicts the toy DJ mixer of FIG. 13A in a transitional configuration.
Figure 13C:
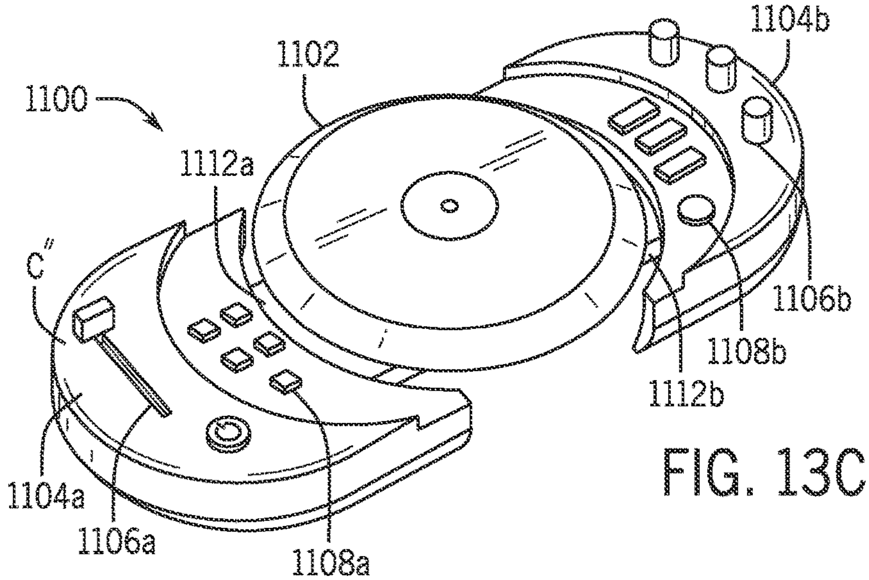
FIG. 13C depicts the toy DJ mixer of FIG. 13A in a second configuration.

With reference to FIGS. 13A-13C, a toy DJ mixer 1100 is depicted that is configured to transition between a retracted configuration C and an expanded configuration C", according to the systems and techniques described herein. The toy DJ mixer 1100 may include a body portion or main mixer portion 1102 with side mixer portions 1104a, 1104b having controls 1106a, 1106b, respectively. FIG. 13A shows the DJ mixer 1100 in a retracted configuration C, in which the side mixer portions 1104a, 1104b is arranged so that the controls 1106a, 1106b are adjacent the main mixer portion 1102.

The side mixer portions 1104a, 1104b may be peripheral components of the toy DJ mixer that are moveable relative to main mixer portion 1102. For example, the side mixer portions 1104a, 1104b may be at least partially received within the main mixer portion 1102 in the retracted configuration C. The side mixer portions 1104a, 1104b may include or be associated with engagement portions 1112a, 1112b, respectively. The engagement portions 1112a, 1112b may engage a track or other feature within the main mixer portion 1102. In this regard, the side mixer portions 1104a, 1104b may slide or move along expandable directions 1110a, 1110b, as may be guided by the respective engagement portions 1014a, 1014b and associated track within the main mixer portion 1102. For example, the side mixer portions 1104a, 1104b may slide or move along expandable directions 1110a, 1110b from the retracted configuration C (FIG. 13A) to a transitional configuration C' (FIG. 13B) to an expanded configuration C" (FIG. 13C). In the expanded configuration C", the side mixer portions 1104a, 1104b may expose secondary controls 1108a, 1108b that provide for additional operations of the toy DJ mixer 1100. In some cases, the side mixer portions 1104a, 1104b may be retained in the extended configuration C" using a retention structure, such as any of the retention structures described herein. Accordingly, the side mixer portions 1104*a*, 1104*b* may be further manipulated form the expanded configuration C" to the retracted configuration C as needed.

Figure 14A:
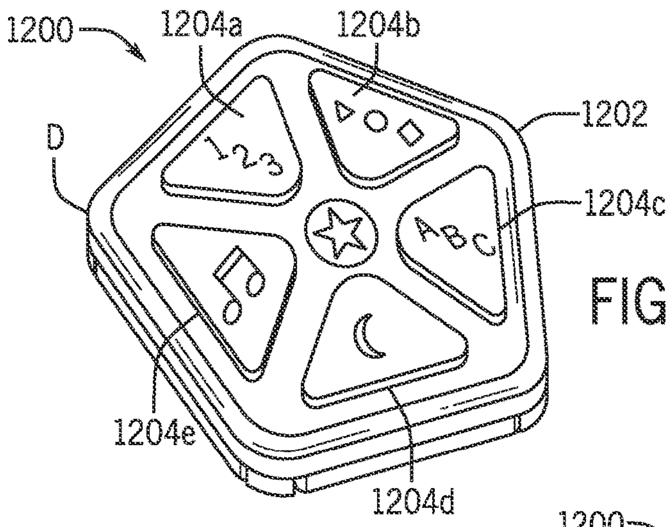
FIG. 14A depicts an early learning toy in a first configuration.
Figure 14B:
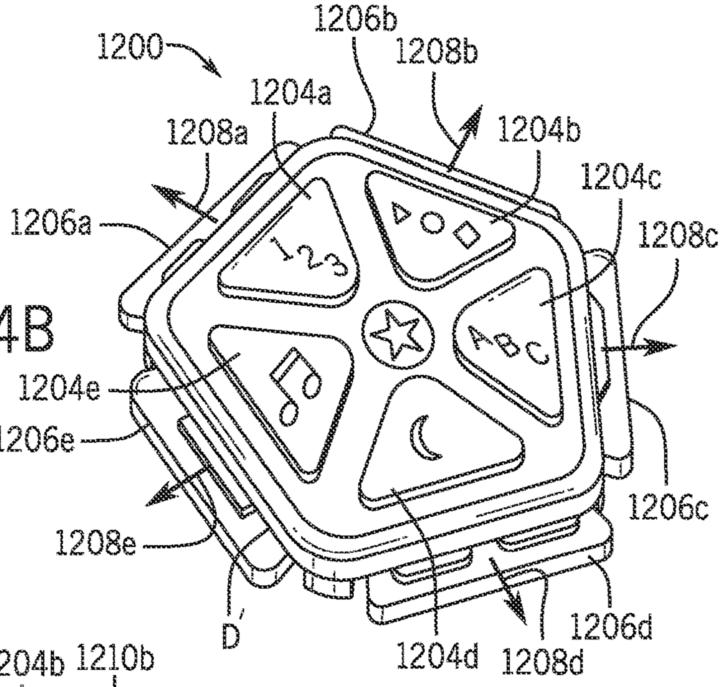
FIG. 14B depicts the early learning toy of FIG. 14A in a transitional configuration.
Figure 14C:
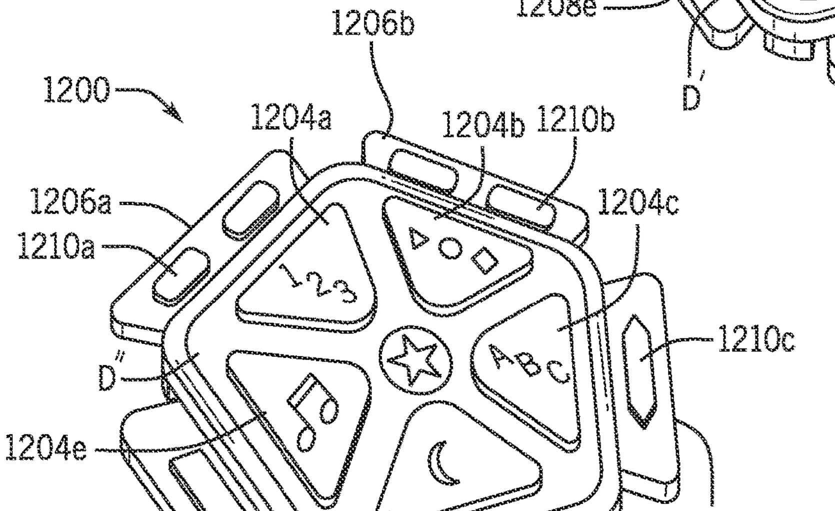
FIG. 14C depicts the early learning toy of FIG. 14A in a second configuration.

With reference to FIGS. 14A-14C, an early learning toy 1200 is depicted that is configured to transition between a retracted configuration D and an expanded configuration D", according to the systems and techniques described herein. The early learning toy 1200 may include a body portion 1202 with top buttons 1204*a*, 1204*b*, 1204*c*, 1204*d*, 1204*e*. FIG. 14A shows the early learning toy 1200 in a retracted configuration D, in which the top buttons 1204*a*-1204*e* are exposed to a user operating the early learning toy 1200, such as by pressing the top buttons 1204*a*-1204*e*.

The body portion 1202 may be a main portion of the early learning toy 1200. The early learning toy 1200 may further include peripheral panels 1206*a*, 1206*b*, 1206*c*, 1206*d*, 1206*e*. The peripheral panels 1206*a*-1206*e* may be at least partially received within the body portion 1202 in the retracted configuration D. The peripheral panels 1206*a*-1206*e* may include or be associated with engagement portions or other features that that facilitate engagement of the respective panels with the main body portion 1202. For example, such engagement portions may engage a track or other feature within the body portion 1202. In this regard, the peripheral panels 1206*a*-1206*e* may slide or move along expandable directions 1208*a*, 1208*b*, 1208*c*, 1208*d*, 1208*e*, respectively, as may be guided by the respective engagement portions and associated track within the body portion 1202. For example, the peripheral panels 1206*a*-1206*e* may slide or move along expandable directions 1208*a*-1208*e*, respectively, from the retracted configuration D (FIG. 14A) to a transitional configuration D' (FIG. 14B) to an expanded configuration D" (FIG. 14C). In the expanded configuration D", the peripheral panels 1206*a*-1206*e* may expose side buttons 1210*a*, 1210*b*, 1210*c*, 1210*d*, 1210*e* that provide for additional operations of the early learning toy 1200. In some cases, the peripheral panels 1206*a*-1206*e* may be retained in the extended configuration D" using a retention structure, such as any of the retention structures described herein. Accordingly, the peripheral panels 1206*a*-1206*e* may be further manipulated form the expanded configuration D" to the retracted configuration D as needed.

Figure 15A:
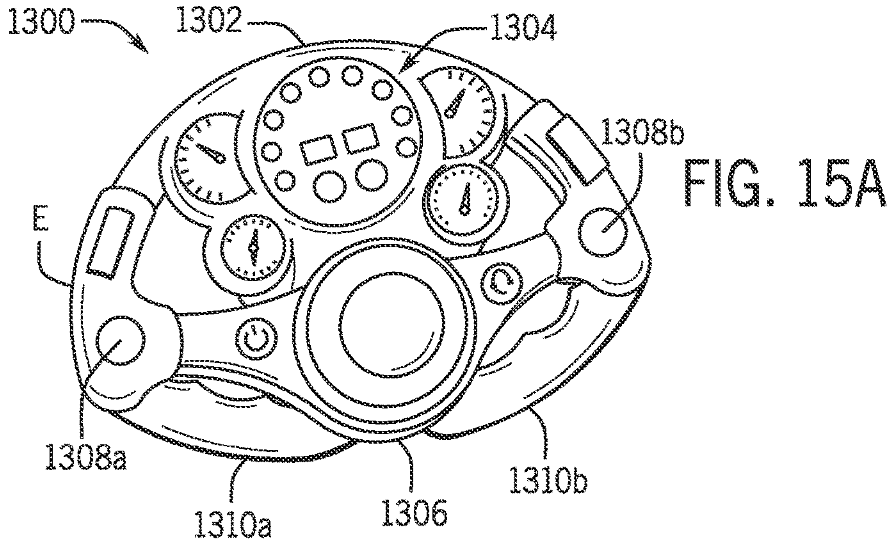
FIG. 15A depicts a driving toy in a first configuration.
Figure 15B:
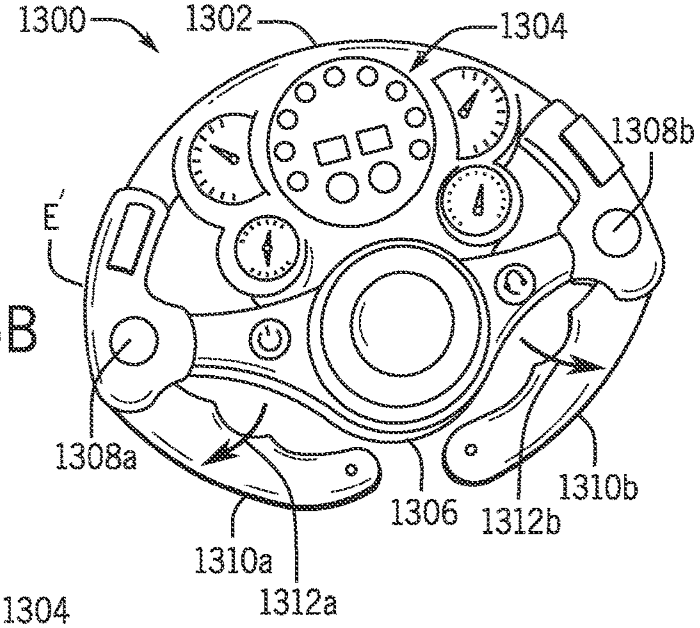
FIG. 15B depicts the driving toy of FIG. 15A in a transitional configuration.
Figure 15C:
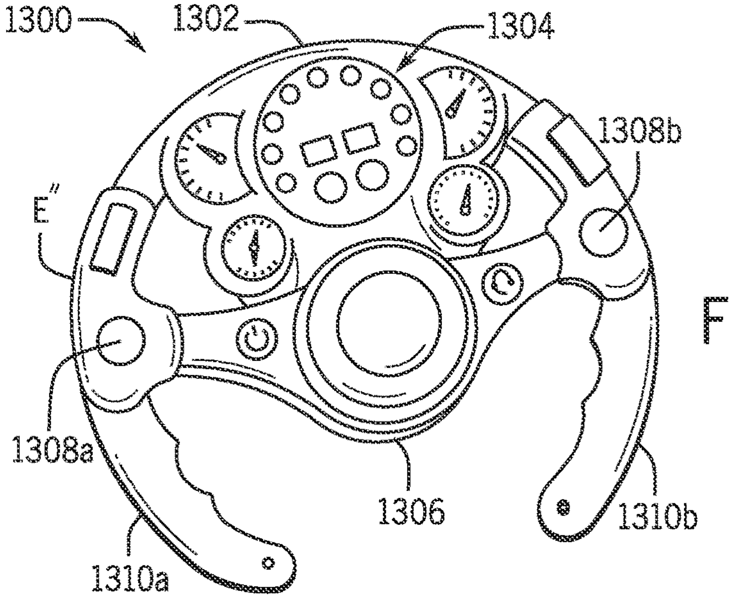
FIG. 15C depicts the driving toy of FIG. 15A in a second configuration.

With reference to FIGS. 15A-15C, a driving toy 1300 is depicted that is configured to transition between a retracted configuration E and an expanded configuration E", according to the systems and techniques described herein. The driving toy 1300 may include a body portion 1302 having controls 1304 and a bridge portion 1306.

The body portion 1302 may be a main portion of the driving toy 1300. The driving toy 1300 may further include moveable handle portions 1310*a*, 1310*b*. The moveable handle portions 1310*a*, 1310*b* may be at least partially received within the body portion 1302 in the retracted configuration E. The moveable handle portions 1310*a*, 1310*b* may include or be associated with engagement portions 1308*a*, 1308*b*, respectively. The engagement portions 1308*a*, 1308*b* may engage a track or other feature within the body portion 1302. In this regard, the moveable handle portions 1310*a*, 1310*b* may rotate or otherwise move along expandable directions 1312*a*, 1312*b*, as may be guided by the respective engagement portions 1308*a*, 1308*b* and associated track within the body portion 1302. For example, the moveable handle portions 1310*a*, 1310*b* may rotate or move along expandable directions 1312*a*, 1312*b* from the retracted configuration E (FIG. 15A) to a transitional configuration E' (FIG. 15B) to an expanded configuration E" (FIG. 15C). In the expanded configuration E", the moveable handle portions 1310*a*, 1310*b* may be fully exposed for operating the driving toy 1300 with the handle portions 1310*a*, 1310*b*. In some cases, the moveable handle portions 1310*a*, 1310*b* may be retained in the extended configuration E" using a retention structure, such as any of the retention structures described herein. Accordingly, the moveable handle portions 1310*a*, 1310*b* may be further manipulated form the expanded configuration E" to the retracted configuration E as needed.

Other examples and implementations are within the scope and spirit of the disclosure and appended claims. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A toy guitar comprising:

a guitar body defining an interior space;

a track extending within the interior space from an opening on a top surface of the guitar body;

a guitar neck defining a headstock at a top end thereof, the guitar neck arranged partially in the opening and manipulateable between an extended position in which the guitar neck extends from the guitar body with the headstock positioned at a first position above the top surface of the guitar body and a retracted position in which the guitar neck is at least partially retracted into the interior space of the guitar body along the track and the headstock is positioned at a second position above the top surface of the guitar body, wherein the second position is closer to the top surface than the first position, and wherein the guitar neck comprises a retention structure configured to retain the guitar neck in the extended position, and upon receipt of a force input, permit a transition of the toy guitar from the extended position to the retracted position.

2. The toy guitar of claim 1, wherein the retention structure is an extend retention structure and the guitar neck further comprises a retract retention structure configured to:

retain the guitar neck in the retracted position, and upon receipt of a force input, permit a transition of the toy guitar from the retracted position to the extended position.

3. The toy guitar of claim 1, wherein the retention structure comprises a detent configured to engage a holding feature of the guitar body.

4. A toy guitar comprising:

a guitar body defining an interior space;

a track extending within the interior space from an opening of the guitar body;

a guitar neck arranged partially in the opening and manipulateable between an extended position in which the guitar neck extends from the guitar body and a retracted position in which the guitar neck is at least partially retracted into the interior space along the track wherein the guitar neck comprises a retention structure configured to retain the guitar neck in the extended position, and upon receipt of a force input, permit a transition of the toy guitar from the extended position to the retracted position, wherein the retention structure comprises a detent configured to engage a holding feature of the guitar body, wherein the holding feature comprises a through portion defined by the guitar body and extending into the interior space, the detent is configured to be received by the through portion from the interior space when the guitar neck is in the extended position.

5. The toy guitar of claim 4, wherein the detent comprises an input surface exposed along the exterior of the guitar body when the detent is received by the through portion, and the detent is flexibly coupled with a main portion of the guitar neck such that in response to the force input on the input surface, the detent is releasable from the holding feature to permit the transition of the guitar from the extended position to the retracted position.

6. A toy guitar comprising:

a guitar body defining an interior space;

a track extending within the interior space from an opening of the guitar body;

a guitar neck arranged partially in the opening and manipulateable between an extended position in which the guitar neck extends from the guitar body and a retracted position in which the guitar neck is at least partially retracted into the interior space along the track wherein the guitar neck comprises a retention structure configured to retain the guitar neck in the extended position, and upon receipt of a force input, permit a transition of the toy guitar from the extended position to the retracted position, wherein the retention structure comprises a detent configured to engage a holding feature of the guitar body, wherein the track extends generally linearly from the opening to a base portion of the guitar body, the guitar body comprises side contours that run a length of the track on opposing sides of the track, the track is inset from the side contours within the interior space, and a width of the guitar body spanning the side contours is at least twice a width of the track.

7. The toy guitar of claim 6, wherein the track comprises at least one guide component extending the length of the track, and the guitar neck is configured to be guided along the track by the at least one guide component.

8. The toy guitar of claim 7, wherein the guitar neck defines a follower component configured for complimentary engagement with the guide component along the track.

9. The toy guitar of claim 1, wherein the toy guitar is configured to emit a light or a sound when the guitar neck is in the extended position, and the transition of the toy guitar from the extended position to the retracted position inhibits emission of the light or the sound.

10. An assembly, the assembly comprising:

a packaging, and the toy guitar of claim 1 held by the packaging, the toy guitar is operable in the extended position and the retracted position without additional assembly or external fasteners.

11. The assembly of claim 10, wherein the toy guitar is contained within a three-dimensional footprint of the packaging when the guitar neck is in the retracted position.

12. The assembly of claim 10, wherein the toy guitar extends beyond a three-dimensional footprint of the packaging when the guitar neck is in the extended position.

13. A toy guitar comprising:

a guitar body defining an interior space and an opening extending into the interior space;

a guitar neck arranged partially in the opening and manipulateable between an extended position in which the guitar neck extends from the guitar body and a retracted position in which the guitar neck is at least partially retracted into the interior space;

an input assembly integrated with the guitar neck configured to cause the toy guitar to emit a light or a sound upon receipt of an input when the guitar neck is in the extended position, wherein the input assembly is electrically uncoupled with a power source of the toy guitar when the guitar neck is manipulated from the extended position.

14. The toy guitar of claim 13, wherein the power source is arranged within the interior space, the guitar neck comprises a neck electrical coupling component arranged in the interior space and electrically coupled with the power source when the toy guitar is in the extended position, and a transition of the toy guitar from the extended position to the retracted position physically displaces the neck electrical coupling component within the interior space to electrically uncouple the input assembly and the power source.

15. The toy guitar of claim 14, wherein the toy guitar further comprises a body electrical coupling component within the interior space, in the extended position, the body electrical coupling component and the neck electrical coupling component form an electrical coupling between the power source and the input assembly, and in the retracted position, the physical displacement of the neck electrical coupling component separates the neck electrical coupling component and the body electrical coupling component to electrically uncouple the input assembly and the power source.

16. The toy guitar of claim 15, wherein the body electrical coupling component and the neck electrical coupling component are each contact plates configured to form the electrical coupling through physical contact.

17. The toy guitar of claim 13, wherein the guitar neck comprises a fretboard, and the input assembly comprises a button assembly arranged on the fretboard and configured to receive the input.

18. The toy guitar of claim 17, wherein the fretboard comprises a button slot, and the button assembly comprises a button piece arranged in and protruding from the button slot, and a switch arranged with the button piece such that a depression of the button piece causes an actuation of the switch, the actuation of the switch configured to cause the emission of the light or the sound.

19. The toy guitar of claim 17, wherein the light or the sound comprises a first light or a first sound, the button assembly comprises a first button assembly configured to cause the emission of the first light or the first sound, and the input assembly further comprises a second button assembly configured to cause an emission of a second light or a second sound different from the first light or the first sound.

20. The toy guitar of claim 13, further comprising a track extending with the interior space from the opening and configured to guide movement of the guitar neck between the extended and retracted positions.

* * * * *